(12) United States Patent
Nichol

(10) Patent No.: US 10,818,040 B2
(45) Date of Patent: Oct. 27, 2020

(54) IMAGE CAPTURE DEVICE FOR A COLOR CUSTOMIZATION SYSTEM

(71) Applicant: Sephora USA, Inc., San Francisco, CA (US)

(72) Inventor: Jamie Gordon Nichol, Carlisle, MA (US)

(73) Assignee: Sephora USA, Inc., San Francisco, CA (US)

( * ) Notice: Subject to any disclaimer, the term of this patent is extended or adjusted under 35 U.S.C. 154(b) by 0 days.

(21) Appl. No.: 16/723,615

(22) Filed: Dec. 20, 2019

(65) Prior Publication Data

US 2020/0211227 A1 Jul. 2, 2020

Related U.S. Application Data

(60) Provisional application No. 62/785,582, filed on Dec. 27, 2018.

(51) Int. Cl.
| | |
|---|---|
| *G06T 7/90* | (2017.01) |
| *H04N 5/225* | (2006.01) |
| *H04N 5/232* | (2006.01) |

(52) U.S. Cl.
CPC ............ *G06T 7/90* (2017.01); *H04N 5/2254* (2013.01); *H04N 5/2256* (2013.01); *H04N 5/232939* (2018.08); *G06T 2207/10024* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2,753,775 A | 7/1956 | Smith | |
| 4,120,582 A | 10/1978 | De Vries | |
| 8,593,634 B1 * | 11/2013 | Igarashi | B01F 11/0094 356/402 |
| 9,007,588 B1 * | 4/2015 | Igarashi | A45D 44/005 356/402 |
| 9,563,050 B2 | 2/2017 | Cheng | |
| 9,858,685 B2 | 1/2018 | Nichol | |

(Continued)

FOREIGN PATENT DOCUMENTS

| | | |
|---|---|---|
| CN | 107589548 | 12/2019 |
| EP | 1833241 | 9/2007 |

(Continued)

*Primary Examiner* — Talha M Nawaz

(74) *Attorney, Agent, or Firm* — Van Pelt, Yi & James LLP

(57) ABSTRACT

In an embodiment, an image capture device includes a housing configured to be attached to a host device (that has a camera and a light source). The device includes a light chamber within the housing. The chamber includes a first port facing a direction where the host camera would be located when the device is attached to the host, and a second port substantially opposite the first port. The device includes a light pipe having an opening that faces a direction where the host device light source would be located. The light pipe is configured to transmit light from the host device light source for providing illumination at or about the second port. The device includes a lens cover configured to move between a closed position in which the lens cover blocks the second port and an open position in which the lens cover does not block the second port.

27 Claims, 24 Drawing Sheets

(56) References Cited

U.S. PATENT DOCUMENTS

| | | | | |
|---|---|---|---|---|
| 2005/0211768 A1* | 9/2005 | Stillman | ................. | G07F 17/16 |
| | | | | 235/381 |
| 2008/0218611 A1 | 9/2008 | Parulski | | |
| 2013/0300919 A1* | 11/2013 | Fletcher | ................. | H04M 1/21 |
| | | | | 348/360 |
| 2014/0081462 A1* | 3/2014 | Igarashi | ............... | A45D 44/005 |
| | | | | 700/265 |
| 2014/0081463 A1* | 3/2014 | Igarashi | ............. | B01F 13/1063 |
| | | | | 700/265 |
| 2018/0368558 A1* | 12/2018 | Park | .................... | B01F 15/0238 |
| 2019/0366285 A1* | 12/2019 | Brandon | ................. | A61K 8/29 |
| 2020/0020011 A1* | 1/2020 | Harvill | ................. | G06K 9/4652 |
| 2020/0121061 A1* | 4/2020 | Nichol | ................... | H05B 47/16 |

FOREIGN PATENT DOCUMENTS

| | | |
|---|---|---|
| EP | 2924977 | 5/2018 |
| WO | 2015082300 | 6/2015 |

\* cited by examiner

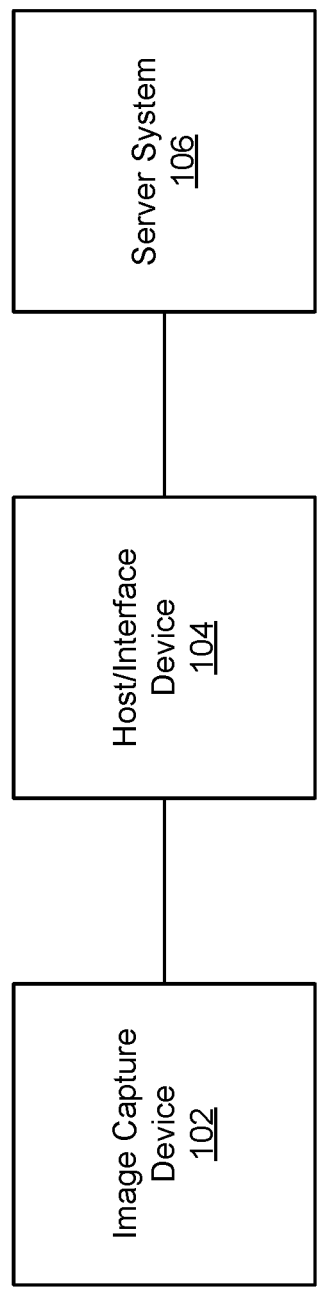

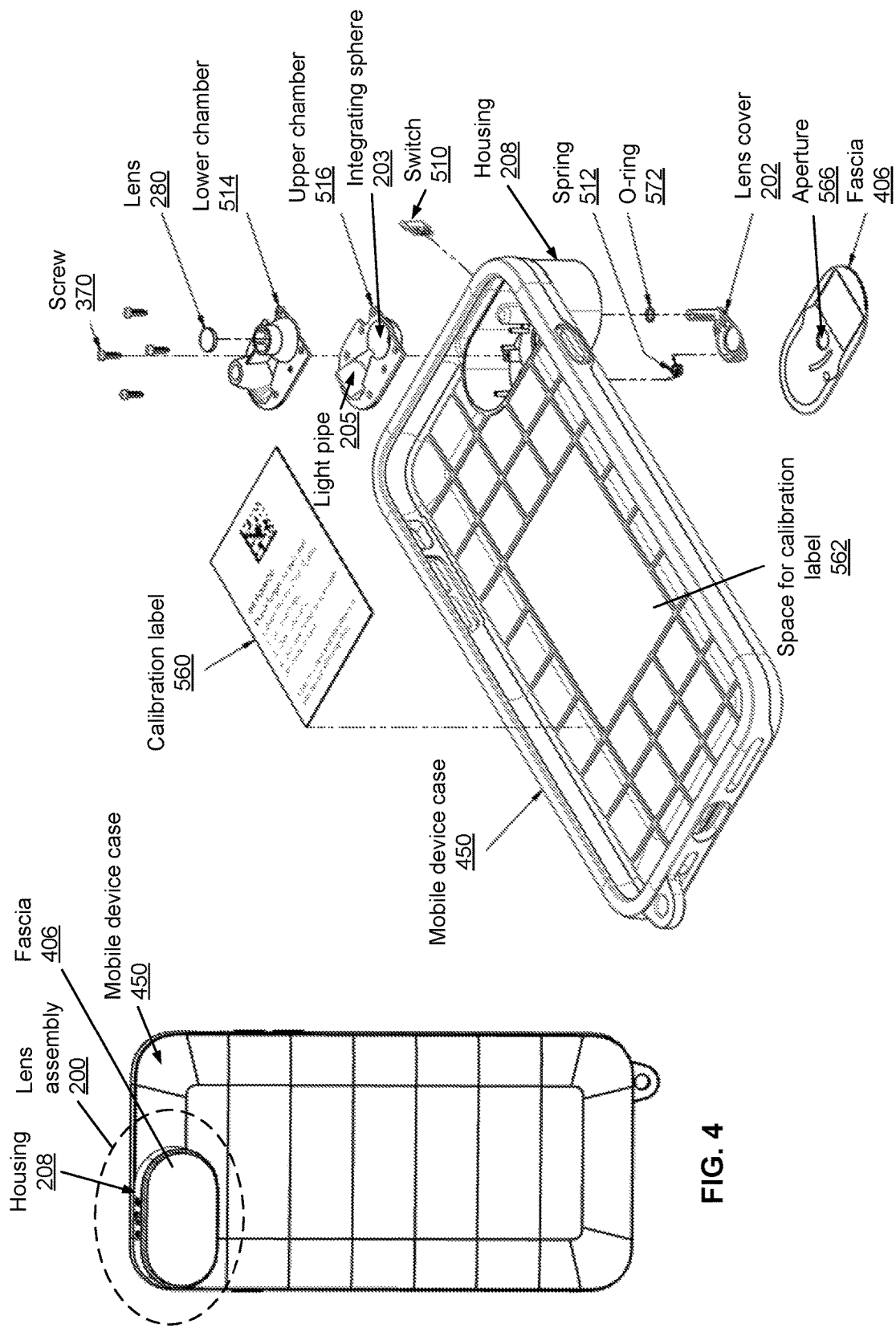

US 10,818,040 B2

IMAGE CAPTURE DEVICE FOR A COLOR CUSTOMIZATION SYSTEM

CROSS REFERENCE TO OTHER APPLICATIONS

This application claims priority to U.S. Provisional Patent Application No. 62/785,582 entitled IMAGE CAPTURE DEVICE filed Dec. 27, 2018 which is incorporated herein by reference for all purposes.

BACKGROUND OF THE INVENTION

The field of custom cosmetics and skin care is growing at a feverish clip. Custom products can be tailored to a specific individual such as the person's facial features, skin tone, or other characteristics. Custom cosmetics and skin care can be used for a variety of objectives including enhancing the appearance of the customer or achieving a desired look. One challenge in developing custom cosmetics and skin care is measuring and determining the customer's skin color.

BRIEF DESCRIPTION OF THE DRAWINGS

Various embodiments of the invention are disclosed in the following detailed description and the accompanying drawings.

FIG. 1 shows an example of a custom cosmetics system in which an image capture device can be provided.

FIG. 4 is a diagram of an image capture device integrated with a host device cover according to an embodiment of the present disclosure.

FIG. 5 shows an exploded view of an image capture device according to an embodiment of the present disclosure.

DETAILED DESCRIPTION

Figure 2A:
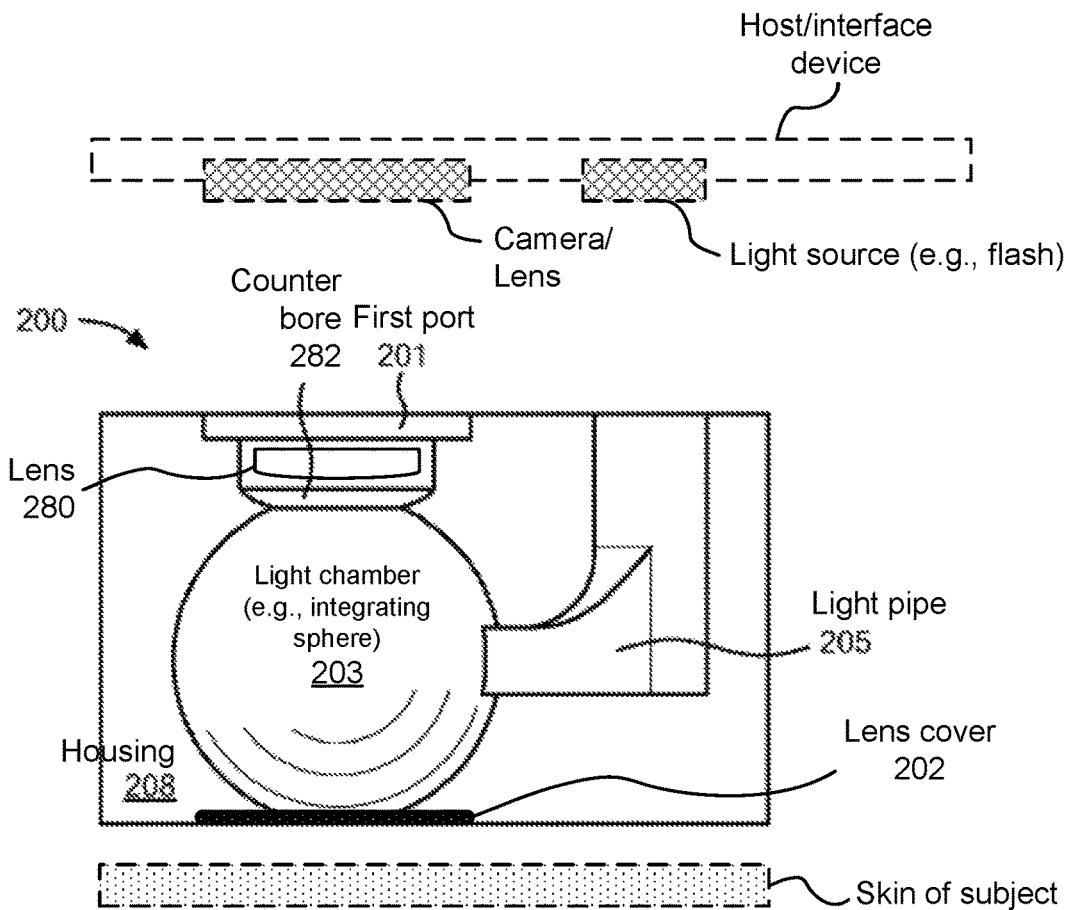
FIG. 2A shows a cross-section of an image capture device according to an embodiment of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An image capture device for a color customization system is disclosed. The image capture device accurately and efficiently measures a subject's skin color. The color customization system formulates custom cosmetics and skin care based on the color identified by the image capture device. First, a color customization system is discussed (FIG. 1 and FIG. 27). Next, an image capture device is discussed (FIGS. 2A-11B). Then, a process for color customization and an example graphical user interface is discussed (FIGS. 12-16). Finally, some additional examples of an image capture device are discussed (FIGS. 18-26).

FIG. 1 shows an example of a custom cosmetics system in which an image capture device can be provided. The custom cosmetics system includes an image capture device 102, a host/interface device 104, and a server system 106.

Image capture device 102 is configured to record skin color measurements of a subject such as an image of a skin sample. The image capture device can locally determine the skin sample color using the image or can transmit the skin color measurements to a remote processor on the host device 104 or the server system 106, and the remote processor determines the skin sample color. Examples of an image capture device are shown in FIGS. 2A-11B and FIGS. 18-26.

Figure 3:
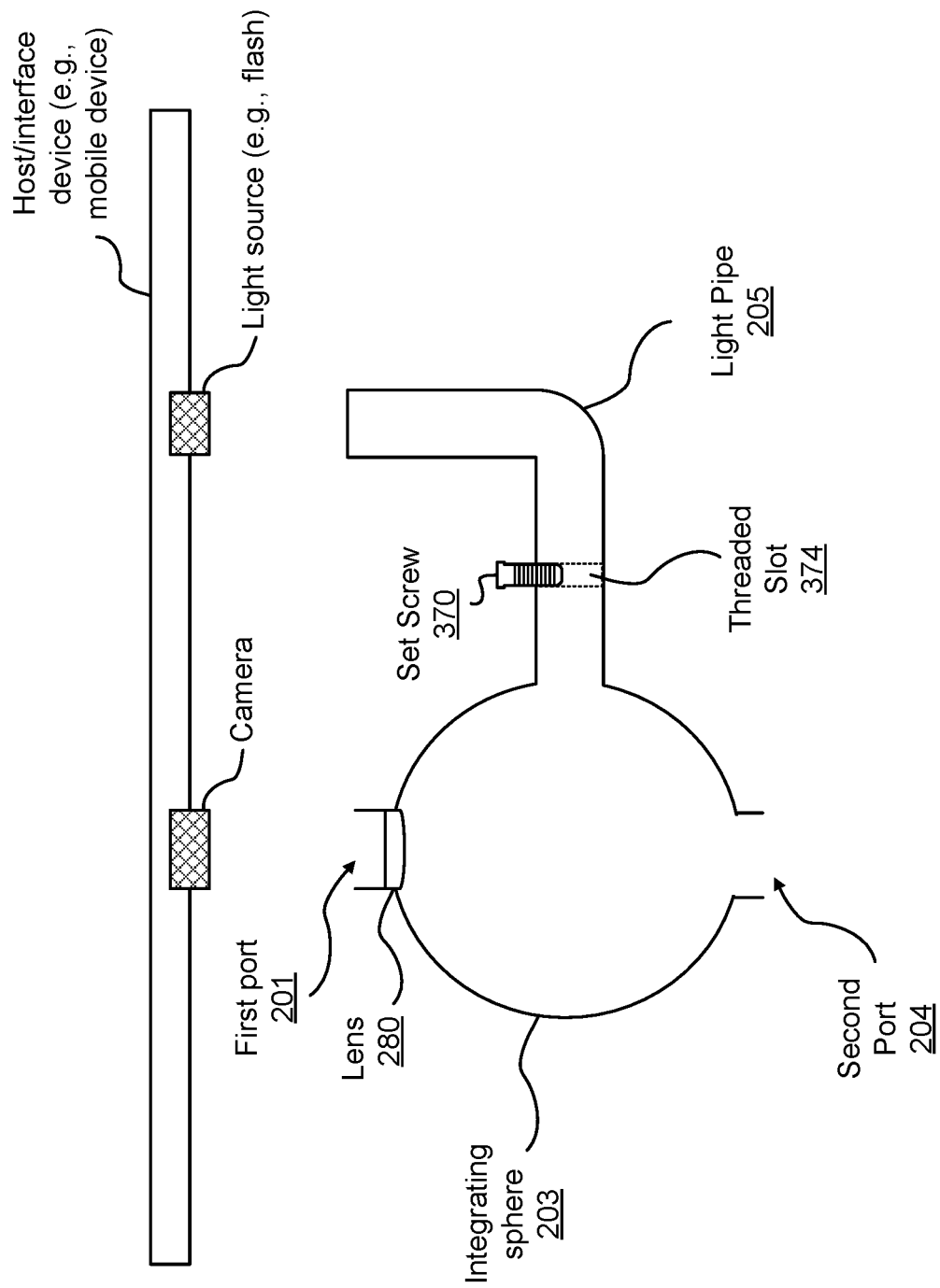
FIG. 3 is a schematic diagram of an image capture device with a light throttling mechanism according to an embodiment of the present disclosure.

Host device 104 (sometimes called an interface device) is configured to receive the skin color measurements transmitted by the image capture device or to help record an image of a skin sample that can be used to determine the color of the skin sample. In various embodiments, the interface device is a mobile device (e.g., smartphone) that runs a specially-configured application to receive the skin color measurements from the image capture device 102 and transmit processed or unprocessed information to a server system 106. Examples of a host/interface device are shown in FIGS. 2A and 3.

Server system 106 is configured to characterize the skin color using the information received from the host device 104 and/or the image capture device 102. In various embodiments, one device (e.g., the server system 106) may perform substantially all of the processing to characterize the skin color or a combination of devices may collectively perform the processing. Some or all functionality of the server system 106 may be integrated into the interface device 104. The interface device 104 and the server system 106 may be located at the same location or at different locations. Communications between the interface device 104 and the server system 106 can utilize any available communication facilities, such as, for example, Internet via cellular or WiFi facilities of the interface device 104.

The characterized skin color can be used for a variety of purposes including determining suitable cosmetics or skin care. The products may already available or can be custom formulated. For example, a mixing/dispensing machine (not shown) is configured to produce a custom cosmetic based on a custom cosmetics recipe. The custom cosmetics recipe is created from the skin color measurements. The custom cosmetics recipe can be generated through processing by the color capture device 102, the interface device 104, the server system 106, and/or the mixing/dispensing machine. FIG. 27 shows an example of a color customization system that also includes a mixing/dispensing machine.

Next, examples of the image capture device 102 will be discussed.

FIG. 2A shows a cross-section of an image capture device according to an embodiment of the present disclosure. For context, a host/interface device having a lens/camera and light source (such as an LED flash) is shown along with the skin of a subject. Image capture device 200, in cooperation with the host device, determines characteristics or colors of the skin sample of the subject. Image capture device 200 covers the lens and flash LED of a portable camera such as a camera that is part of host device. The host device, sometimes called an interface device, can be a smart phone or other camera-equipped portable computing device.

The apparatus (image capture device 200) includes housing 208, light chamber 203, light pipe 205, and lens cover 202. Light chamber 203 is located within housing 208, and has a first port 201 facing a direction where the host device camera would be located when the apparatus is attached to the host device. The light chamber includes a second port 204 substantially opposite the first port. Light pipe 205 is configured to transmit light from the light source of the host device for providing illumination at or about the second port 204. An opening in the light pipe 205 faces a direction where the host device light source would be located when the apparatus is attached to the host device. Lens cover 202 is configured to move between a closed position in which the lens cover blocks the second port and an open position in which the lens cover does not block the second port and an image of the subject's skin can be taken as further described below.

Housing 208 is part of an assembly that includes a lens 280 and other components that are used to direct light from the flash so as to provide indirect illumination of a subject's skin and to provide a light path by which the camera of the host device can capture an image of the subject's skin. For convenience, the image capture device is sometimes referred to as a lens assembly.

In certain exemplary embodiments, light from the flash is directed into a chamber 203 within the lens assembly housing 208, which, in certain exemplary embodiments, is an integrating sphere 203. Preferably, the lens assembly housing 208 does not provide a direct light path from the flash to the subject's skin. For example, in certain exemplary embodiments, light from the flash is directed toward a surface of the chamber rather than being directed toward an aperture or opening through which an image of the skin is captured. In some alternative embodiments, light from the flash may be directed obliquely to the skin either from within the chamber or from outside of the chamber.

In certain exemplary embodiments, the chamber (such as the integrating sphere 203) is coated with a diffuse, reflective coating. Alternatively, the integrating sphere 203 may be fabricated from a material that provides a diffuse, reflective surface, such as, for example, selective laser sintered (SLS) nylon. The SLS nylon may be easier to produce and may be less affected by materials that are likely to come into contact with the integration sphere surface (e.g., skin, oils, sweat, makeup, etc.) compared to a coated surface.

In certain exemplary embodiments, the lens assembly housing 208 includes a light pipe 205 to direct light from the flash into the chamber within the lens assembly housing 208. Indirect illumination of the skin can be accomplished, for example, by ensuring that the light pipe does not provide a direct light path from the flash to the subject's skin, e.g., by configuring the light pipe to turn a corner and also by directing the output of the light pipe into the chamber away from the aperture or opening through which an image of the skin is captured. It should be noted that embodiments may have multiple light pipes and/or a single light pipe that divides into multiple branches, for example, so that light can be directed to different locations and/or in different directions. In some embodiments, the light pipe is conical with the larger opening facing the host device flash and the smaller opening facing the integrating sphere.

Alternative embodiments also can include different types of light chambers and other internal structures; embodiments are not limited to use of an integration sphere with light pipe. The term "light pipe" can include any mechanism configured to transmit light from the flash LED for providing illumination for color capture at the port 204 and can be configured to direct light into the light chamber and/or outside of the light chamber to directly or indirectly provide illumination for the subject's skin.

Figure 2B:
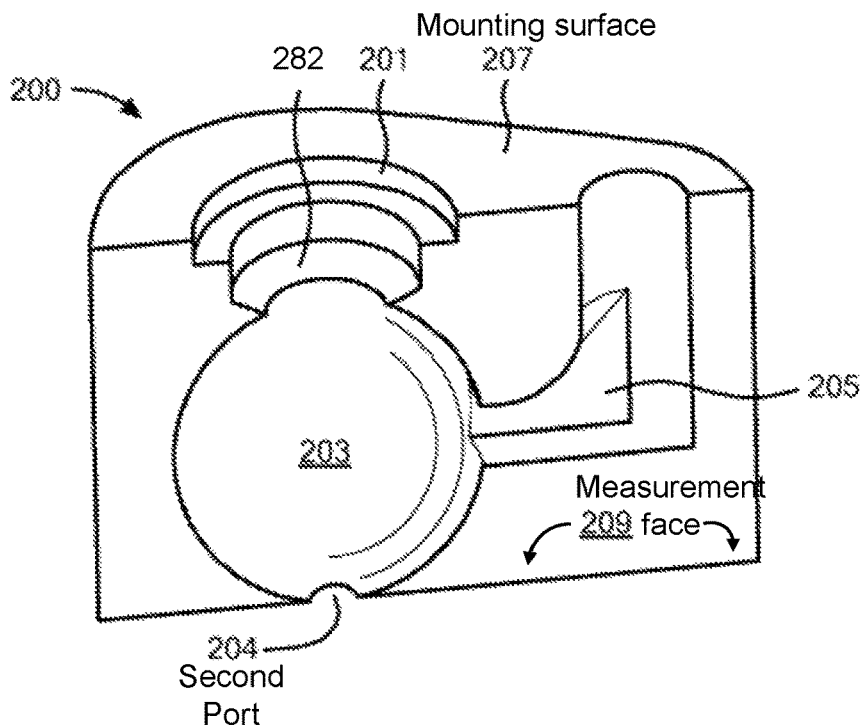
FIG. 2B shows an alternative cross-section of an image capture device according to an embodiment of the present disclosure.

FIG. 2B shows an alternative cross-section of an image capture device according to an embodiment of the present disclosure. Some of the components in FIG. 2A have been removed to more clearly illustrate the example. Image capture device 200 directs the light from the flash LED built into the camera through the reflective light pipe 205. The light reflects off the inner surface of the light pipe until it is either absorbed or enters the light chamber 203. In various embodiments, the light chamber includes or is implemented by an integrating sphere, so it is sometimes simply referred to as an "integrating sphere" herein. The integrating sphere 203 is coated with a diffuse, highly reflective coating, which causes the light to reflect off the inner surface one or more times before illuminating the skin sample of the subject visible in the port 204, thereby providing non-directional illumination to the skin sample.

When the measurement face 209 is held against the skin, the housing 208, being opaque, prevents ambient light from entering the integrating sphere 203. Some of the light which strikes the skin sample through the port 204 passes through a plano-convex lens 280 held in a suitably shaped counter bore 282 and passes through first port 201 into the camera lens of the host device. The plano-convex lens is oriented such that the convex surface faces the port 204. Thus, the convex surface distributes any light reflected from the convex surface into the sphere, instead of concentrating the reflected light back toward the port 204. The plano-convex lens also serves to shorten the focal distance—acting as a macro lens. While this exemplary embodiment is described with reference to a plano-convex lens, it should be noted that alternative embodiments may use another type of lens, such as, for example, a bi-convex lens or a positive meniscus lens.

The housing 208 attaches to the host device, e.g., via pressure sensitive adhesive applied to the mounting surface 207 or by being integrated with a case for the host device as shown in FIGS. 4 and 5. When properly attached, the host camera lens is centered in front of the first port 201 and the host light source (e.g., flash LED) is centered in the entry to the light pipe 205.

The next figure shows an example of how light entering the light pipe can be controlled by a throttling mechanism.

FIG. 3 is a schematic diagram of an image capture device with a light throttling mechanism according to an embodiment of the present disclosure.

A light throttling mechanism controls the amount of light passing through the light pipe, and can be used for (among other things) calibrating the device generally or with respect to a specific mobile device or other device. For example, different light pipes may transmit different amounts of light, e.g., due to variations in the manufacturing process, and the throttling mechanism may be adjusted in individual devices so that the light pipes transmit a consistent amount of light across various devices. Additionally or alternatively, different flashes may produce different amounts of light, and the throttling mechanism may be adjusted in individual devices so that a predetermined amount of light from the flash is transmitted through the light pipe.

In certain exemplary embodiments, the throttling mechanism includes a set screw that interfaces with a threaded slot in the light pipe. The amount of light blocked by the screw (and, therefore, the amount of light allowed to pass through the light pipe) is based on the depth of the set screw within the threaded slot, which can be adjusted by tightening or loosening the set screw. The threaded slot may extend partially through the light pipe or may extend full through the light pipe. In certain exemplary embodiments, the set screw is a stainless steel set screw, although other types of screws may be used, including a plastic screw (e.g., a white plastic screw). Other types of throttling mechanisms may be used in various alternative embodiments, such as, for example, a filter placed between the flash and the light pipe, where different filters having different amounts of light opacity, transmission, or absorption can be used to provide different amounts of throttling.

Shown here is a host device with camera and flash, and an integrating sphere 203 with a light pipe 205 having a set screw 370 interfaced with a threaded slot 374 in the light pipe 205. The amount of light passing from the flash to the integrating sphere 203 is based on the depth of the set screw within the threaded slot, which can be adjusted by tightening or loosening the set screw. In this example, the light pipe 205 ensures that there is no direct light path from the flash to the first port 201, e.g., by configuring the light pipe to turn a corner and also by directing the output of the light pipe into the chamber away from the aperture or opening.

FIG. 4 is a diagram of an image capture device integrated with a host device cover according to an embodiment of the present disclosure. The image capture device (lens assembly) 200 is configured to record skin color measurements such as a skin sample image in cooperation with a camera of the host device as further described below. Housing 208 protects components of the lens assembly. In this view, an oblong fascia 406 extends to the edges of the housing and covers and protects the contents of the housing. The fascia encloses the light chamber, light pipe, and internal lens cover within the housing. The next figure shows an exploded view of the image capture device.

Referring to FIG. 4, in various embodiments, the lens assembly 200 is integrated with and mounted on a mobile device case 450. The case 450 is adapted for the host device such as a smart phone. For example, case 450 is made of a material such as silicone, rubber, or plastic (flexible or hard) to be fitted around the host device to ensure alignment of lens assembly 200 with the camera(s) and/or flash of the host device. Here the mobile device case is depicted as covering the rear of the host device (the side that the two rear-facing cameras are located in an iPhone® 7 Plus for example), but other types of cases are possible. For example, instead of covering the entire rear and sides of the mobile device, the case may instead be a bumper-style case that covers the sides of the device.

In various embodiments, the image capture device does not have an integrated mobile device case. In such embodiments, the image capture device includes housing 208 and lens assembly 200 but not the mobile device case 450. In such embodiments, the image capture device is configured to be installed directly on the host device and is removably attached to the host device with a clip, adhesive, or other means that aligns the lens assembly with the camera lens and flash of the mobile device.

For the sake of illustration, the host device is an iPhone® 7 Plus, which has two rear-facing cameras (one is a primary telephoto lens/camera and the other is a wide-angle lens/camera) and an LED flash. As further described below, when installed, the image capture device lens assembly has a first port aligned with the primary telephoto lens, an opening to a light pipe aligned with the flash LED, and an optional wide-angle aperture aligned with the wide-angle lens. This is not intended to be limiting and the lens assembly can be adapted for other types of host devices for example by accommodating fewer or more lenses/light sources or lenses/light sources of other sizes or types.

FIG. 5 shows an exploded view of an image capture device according to an embodiment of the present disclosure. The exploded view corresponds to the image capture device shown in FIG. 4. In this view, the components are depicted from the inside of the mobile device case 450. The portion of the fascia 406 visible in FIG. 4 is facing down and not visible in FIG. 5 so that the portion that is visible here is the side facing the inside of the lens assembly.

The image capture device includes mobile device case 450, housing 208, and fascia 406, which are like their counterparts described in FIGS. 2A and 2B. In this exploded view, the components that make up lens assembly 200 and provided inside the housing are visible: lens 280, lower chamber 514, upper chamber 516, and lens cover 202.

Figure 11A:
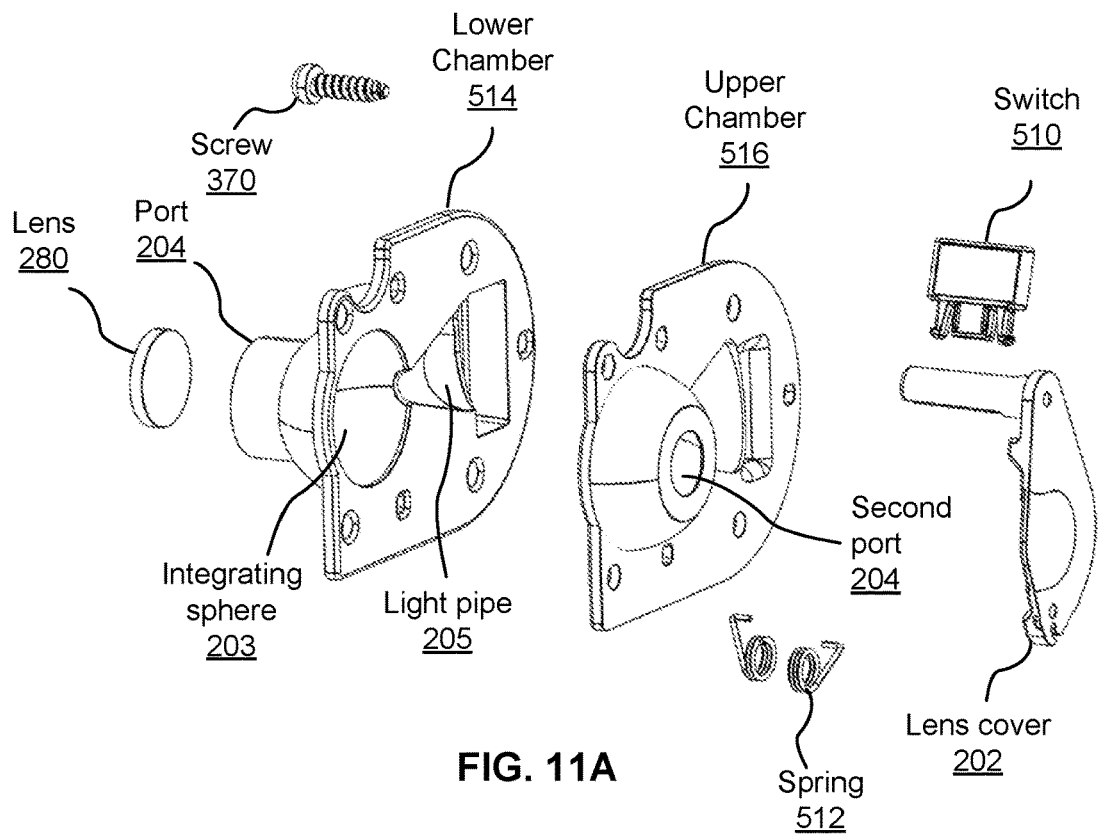
FIG. 11A is an exploded view of the lower chamber and upper chamber of a lens assembly for an image capture device according to an embodiment of the present disclosure.
Figure 11B:
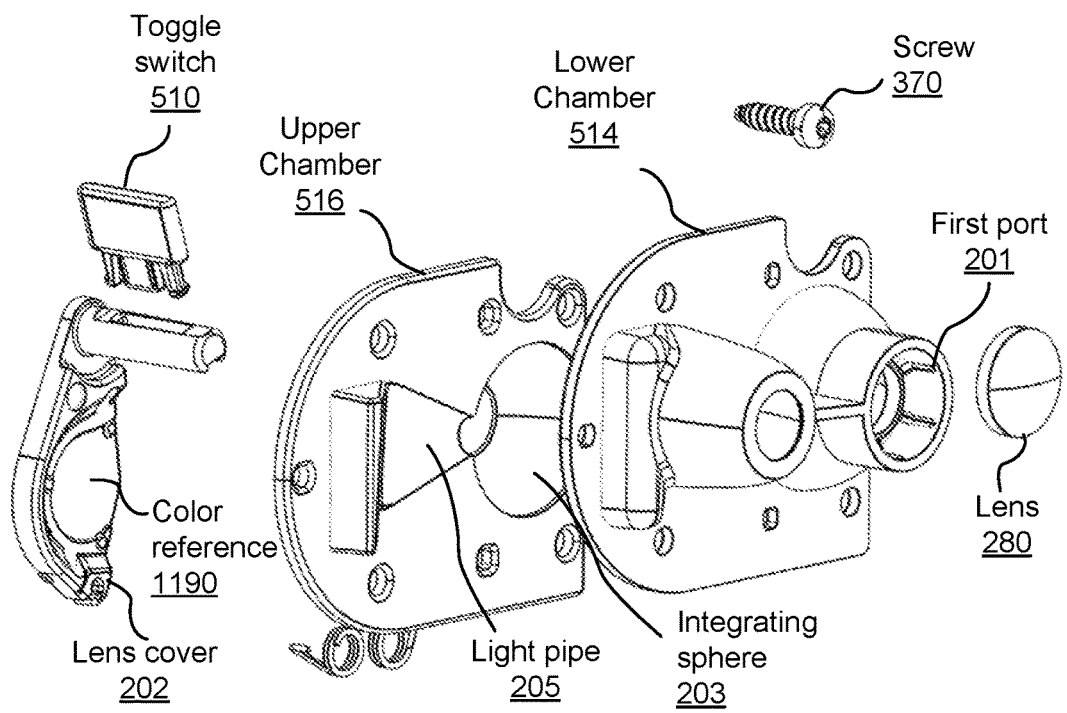
FIG. 11B is an alternate exploded view of the lower chamber and upper chamber of a lens assembly for an image capture device according to an embodiment of the present disclosure.

Lower chamber 514 and upper chamber 516 include recesses that, when the chambers are coupled, form a light pipe 205 and an integrating sphere 203. Lens 280 is installed in alignment with the integrating sphere to help focus the light because the image capture device is relatively close to the skin sample when taking a picture of the skin sample. A more detailed example of a light pipe and integrating sphere is shown in FIGS. 11A and 11B. As further described herein, when the lens assembly is installed on a host device, a first port of the integrating sphere 203 will be centered in front of the primary camera of the mobile device, the light pipe 205 will be centered in front of the flash LED of the host device, and optionally (not shown) a wide-angle aperture will be centered in front of the wide-angle camera. An example of a wide-angle aperture is shown in FIG. 6A. The lower and upper chambers are fastened together using screws 370. The number and placement of the screws are merely exemplary and not intended to be limiting.

Figure 10A:
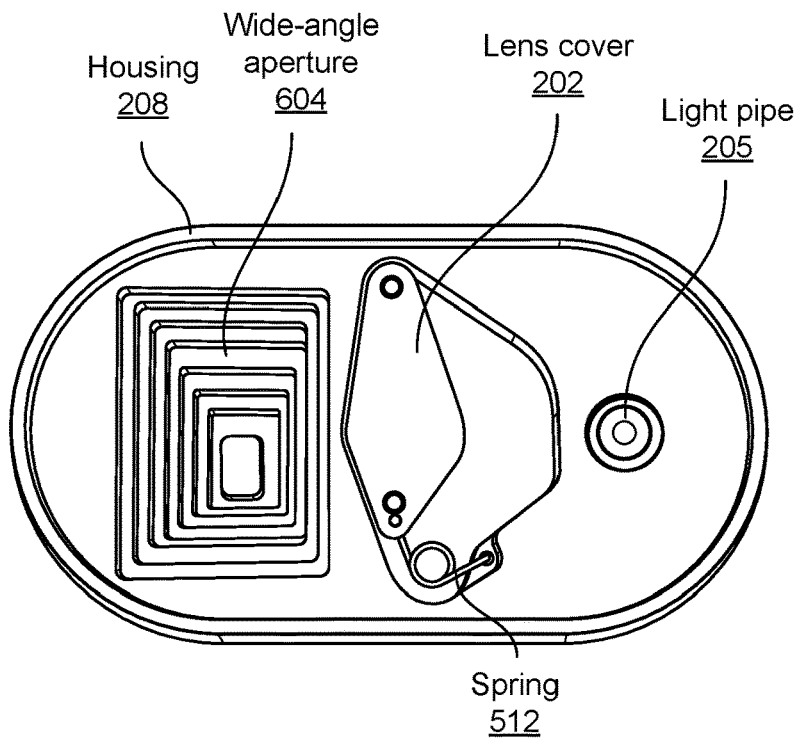
FIG. 10A is a front view of a lens assembly of an image capture device with the lens cover in a closed position according to an embodiment of the present disclosure.
Figure 10B:
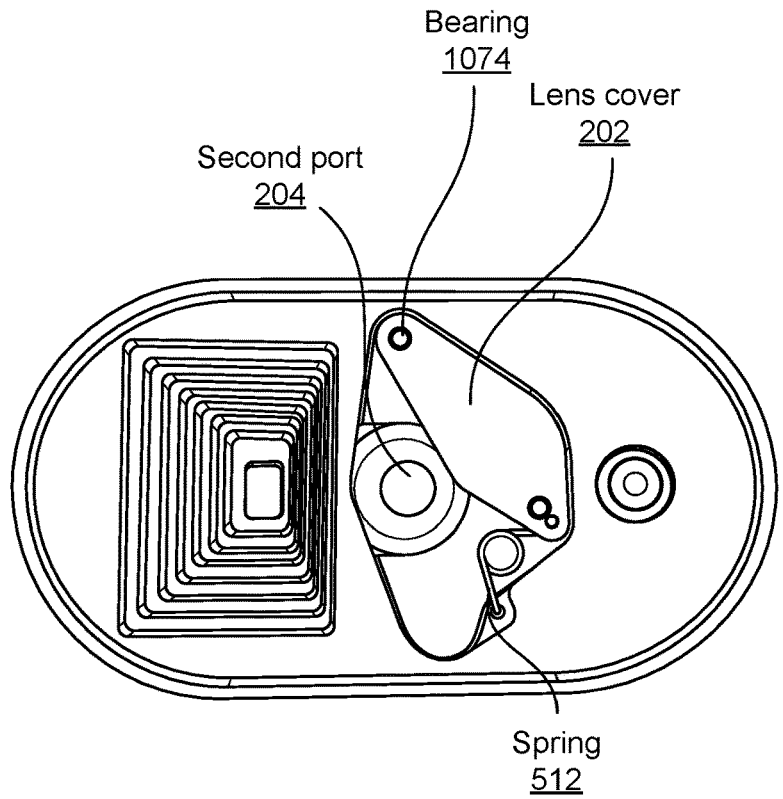
FIG. 10B is a front view of a lens assembly of an image capture device with the lens cover in an open position according to an embodiment of the present disclosure.
Figure 18:
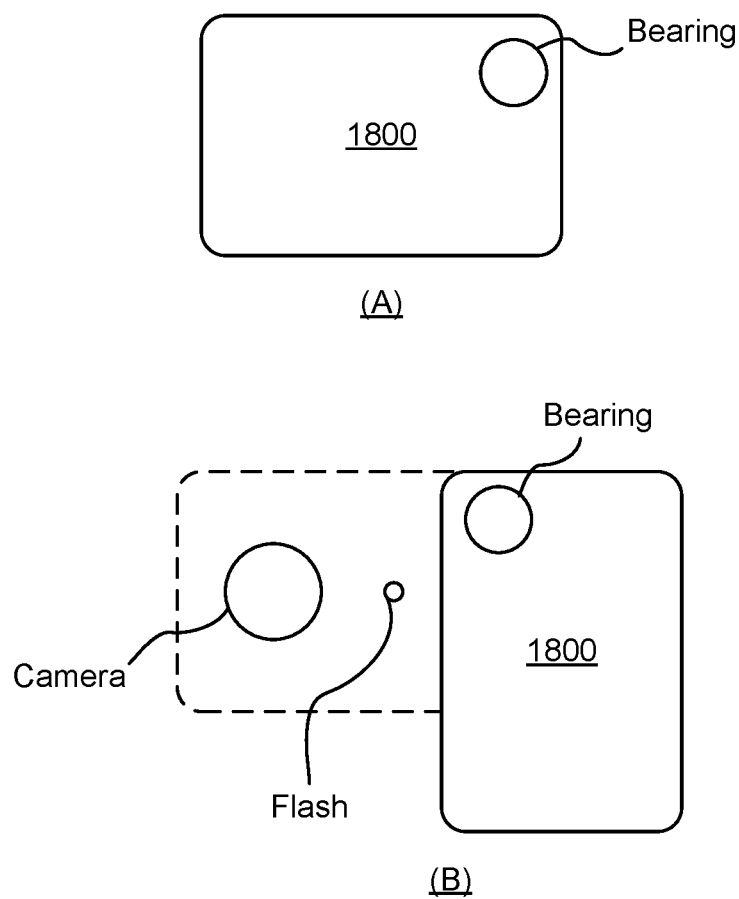
FIG. 18 is a diagram of an image capture device having a pivoting lens cover according to an embodiment of the present disclosure.

Lens cover 302 is controlled by switch 510 to move between an open position in which the second port 204 of the integrating sphere is exposed and an image of the subject's skin can be taken and a closed position in which the second port 204 is blocked. Spring 512 and O-ring 572 make up the lens cover moving mechanism as further described with respect to FIGS. 10A and 10B. The lens cover is configured to pivot between the open and closed positions (FIGS. 10A and 10B and FIG. 18 show some examples), although other types of configurations are possible (e.g., slide side-to-side or up-and-down between the open and closed positions as shown in FIGS. 19-26 show some examples).

Fascia 406 has an aperture 566 that aligns with integrating sphere 303 when installed to permit light to pass through. As shown, fascia 406 has a rectangular opening to align with a wide-angle aperture, which is not shown here but is shown in FIG. 6A.

The image capture device can be calibrated to adjust for characteristics of the image capture device itself or the host device. In various embodiments, the cover includes a color reference on an inside surface that can be used to calibrate the camera and/or to make color adjustments during analysis or processing of an image of the subject's skin as further described with respect to FIG. 11B.

The image capture device can be uniquely identified and/or associated with the host device. In various embodiments, calibration label 560 is provided on the inside of the mobile device case 450 in the rectangular space 562 shown. The calibration label includes information (such as a unique identifier) to uniquely identify a specific image capture device and characteristics of the image capture device. For example, before installing the mobile device inside case 450, the mobile device scans a barcode on the label 560. In various embodiments, scanning the barcode triggers a calibration process that downloads color correction data to an application on the mobile device so that the color correction data is available locally on the mobile device. An example of a calibration process is further described below.

The following figures show the image capture device lens assembly region corresponding to the dashed area of FIG. 4 in more detail. The components in the following figures are like their counterparts in the preceding figures unless otherwise described herein.

FIG. 6A is a front view of an image capture device according to an embodiment of the present disclosure. FIG. 6A corresponds to the dashed area of FIG. 4.

The lens assembly 600 is configured to be coupled to a mobile device case 450, although in alternative embodiments, the lens assembly 600 can be configured to be coupled to a host device directly or via other means. The lens assembly 600 is configured to work with a mobile device that includes a flash LED, a primary camera, and (optionally) a wide-angle camera as currently included in certain commercially-available mobile devices.

The switch 510 can be seen extending through the top of the housing 208. In various embodiments, the switch is a toggle switch that controls a lens cover (not shown) to be open or closed.

Figure 6B:
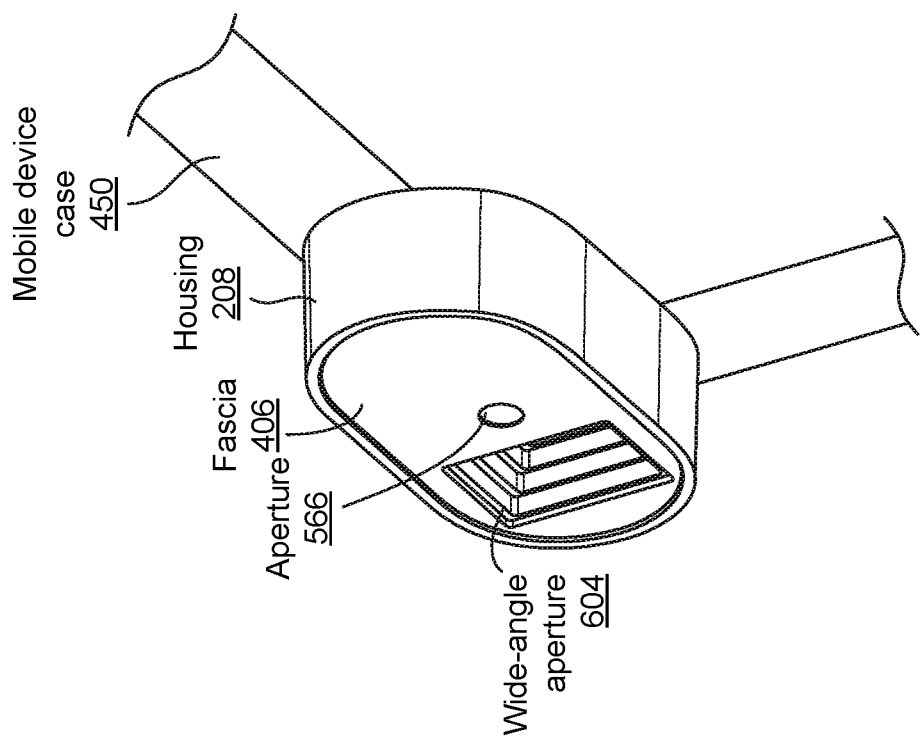
FIG. 6B is a perspective view of a lens assembly of an image capture device according to an embodiment of the present disclosure.
Figure 6A:
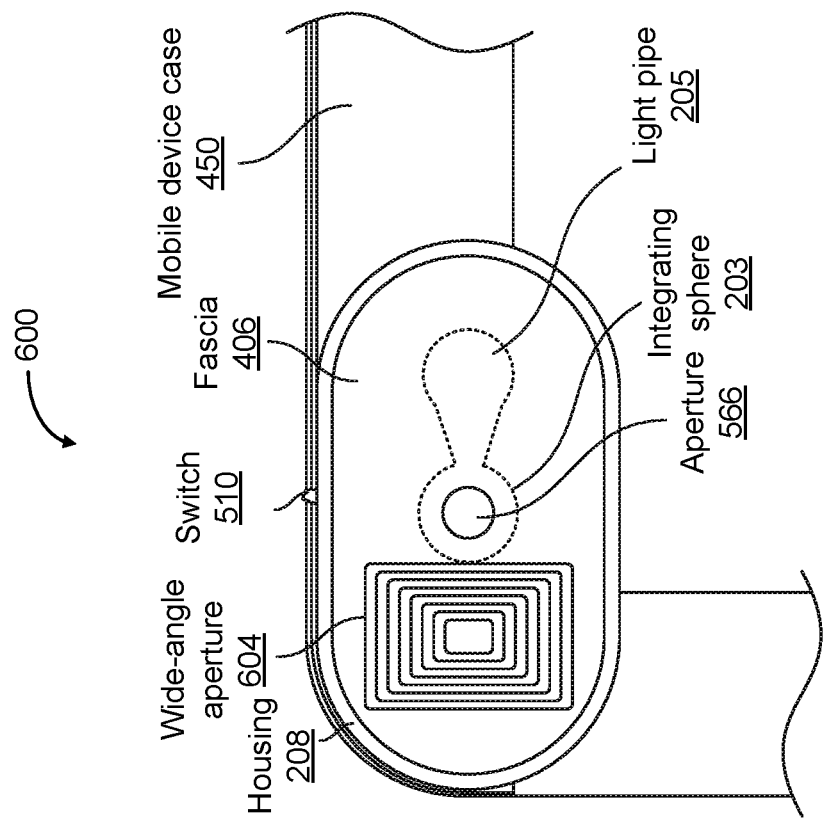
FIG. 6A is a front view of an image capture device according to an embodiment of the present disclosure.

FIG. 6B is a perspective view of a lens assembly of an image capture device according to an embodiment of the present disclosure. When using the image capture device, the flat fascia 406 is pressed against a skin sample such as against the cheek of a customer. Some of the skin can pressed beneath (poke through) the aperture 566. Fascia 406 covers and protects the internal components of the lens assembly 600 and provides a surface to place against a subject's skin. The fascia 406 includes an aperture 566 to the second port 204 of the integration sphere 203 (when the lens cover is in the open position). The fascia can be backpainted or masked to block light from passing through the fascia except through aperture 566. Fascia 406 is made of a material to permit some skin to go beneath the fascia. In various embodiments, the fascia is made of plastic or glass.

Unlike the preceding figures, this example of an image capture device includes a wide-angle aperture. This image capture device is an example for an iPhone® 7 Plus, which has a wide-angle camera adjacent to a primary telephoto camera. The wide-angle aperture 604 allows photographs to be taken by the wide-angle camera. For context, the approximate location and coverage area of the integrating sphere 203 and light pipe 205 within the housing is represented by the dashed circle. When installed, wide-angle aperture 604 is aligned with the host device's wide-angle camera, the aperture 566 and integrating sphere 203 are aligned with the host device's primary telephoto camera, and an opening to the light pipe 205 is aligned with the host device's flash LED.

Figure 7:
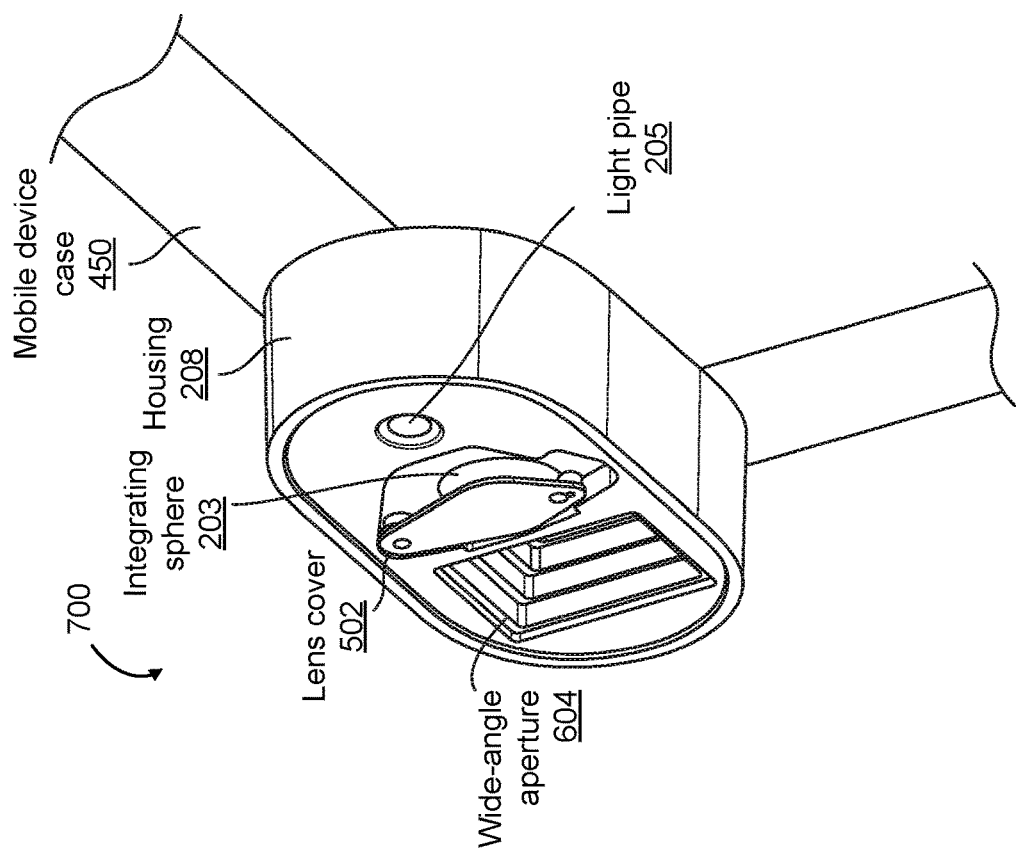
FIG. 7 is a perspective view of a lens assembly of an image capture device with the fascia removed according to an embodiment of the present disclosure.

FIG. 7 is a perspective view of a lens assembly of an image capture device with the fascia removed according to an embodiment of the present disclosure. To better illustrate the components of the lens assembly, fascia 406 and spring 512 are not shown here.

Lens assembly 700 includes, within housing 208, an integration sphere 203 with light pipe 205 and a wide-angle aperture 604. These elements are positioned so that, when the lens assembly 700 is installed on the mobile device, the second port 204 of the integrating sphere 203 is centered in front of the primary camera, the light pipe 205 is centered in front of the flash LED, and the wide-angle aperture 604 is centered in front of the wide-angle camera. In this exemplary embodiment, the wide-angle aperture 604 is simply a portal that allows photographs to be taken via the wide-angle camera while the lens assembly 600 is installed, e.g., for reading bar codes or QR codes. The flash LED and primary camera are used to capture images via the integration sphere 203, e.g., images of a subject's skin for use in preparing a custom cosmetic.

Lens assembly 700 includes an internal movable lens cover 202 that can be moved between two positions via a toggle switch accessible from outside of the lens assembly 700, specifically a closed position in which the lens cover 202 is positioned so that the second port 204 of the integrating sphere 203 is blocked and an open position in which the lens cover 502 is positioned so that the port is unblocked.

Figure 8:
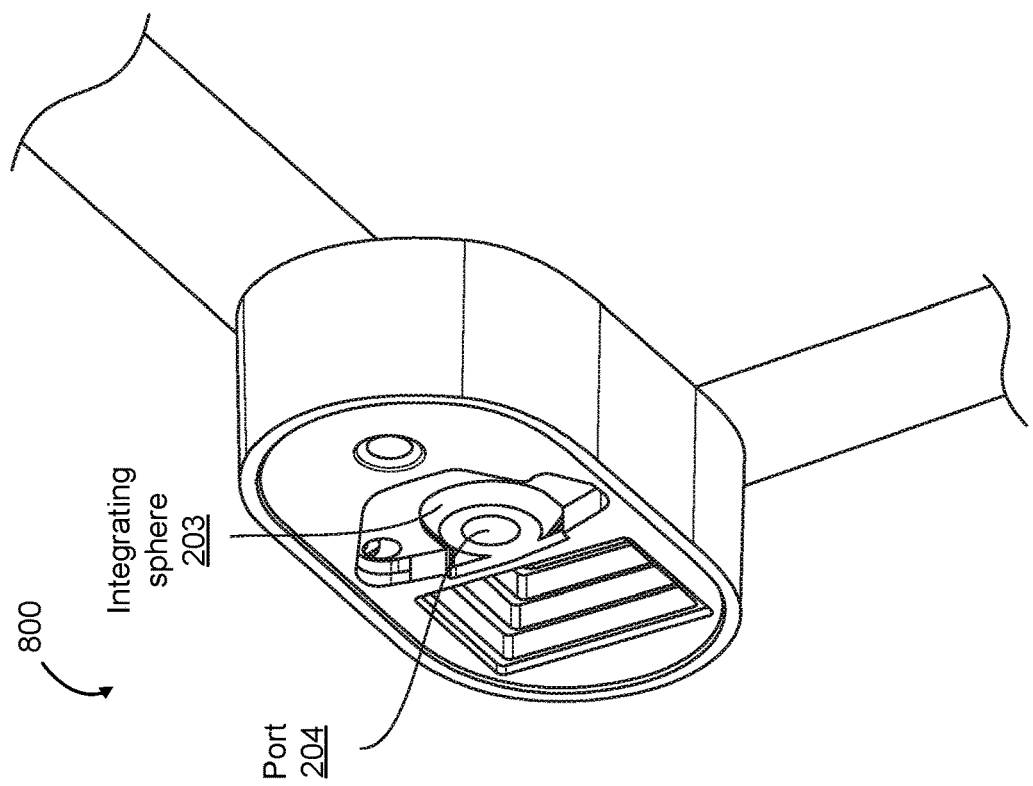
FIG. 8 is a schematic diagram showing the lens assembly 700 of FIG. 7 without the lens cover.

FIG. 8 is a schematic diagram showing the lens assembly 700 of FIG. 7 without the lens cover. As can be seen, the lens assembly 800 includes a recessed area in which the lens cover 502 is situated. The recessed area includes a cavity configured to receive a corresponding projection of the lens cover 502 to act as a pivot point for toggling the lens cover 502 between the two positions.

Figure 9:
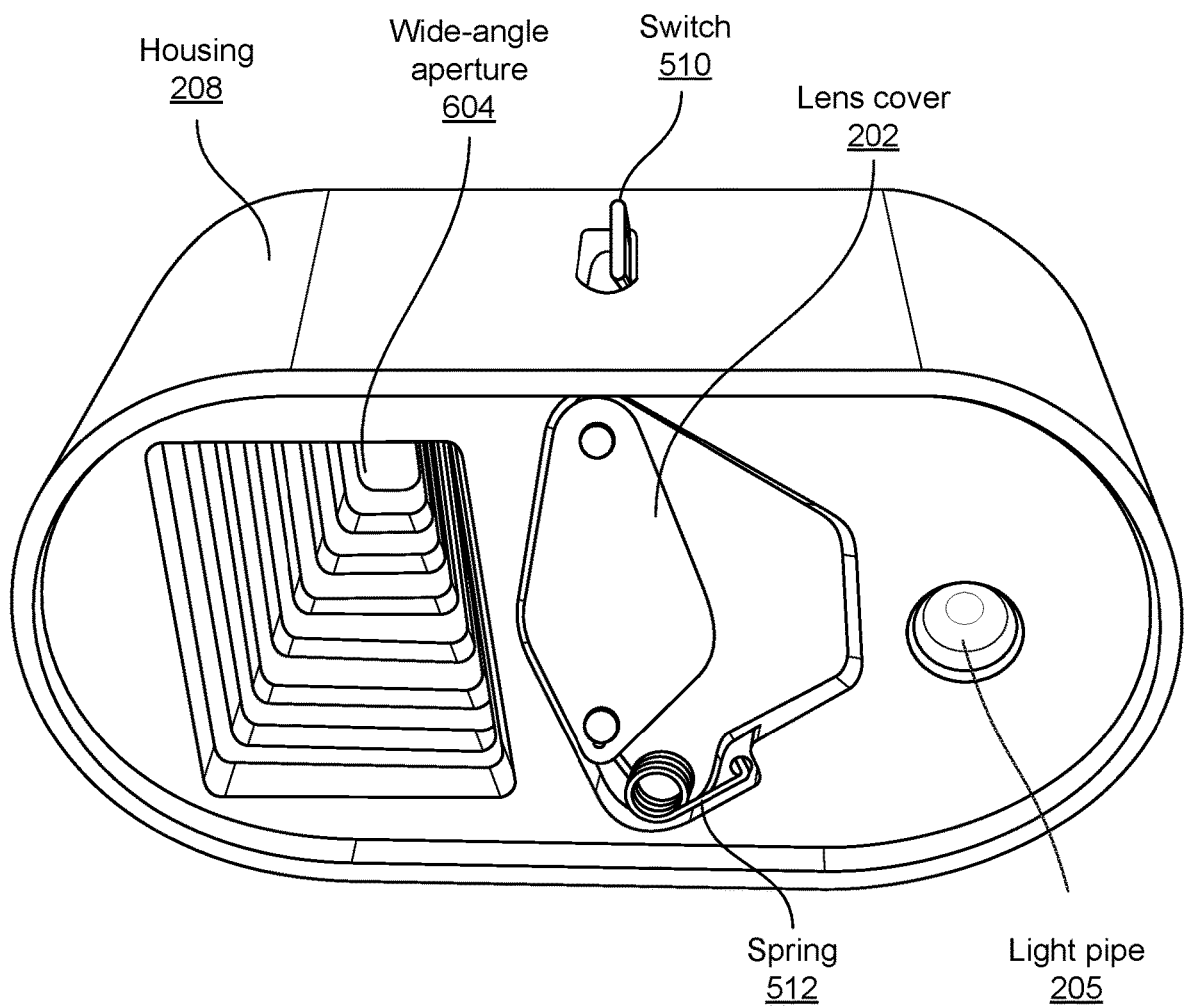
FIG. 9 is a perspective view of a lens assembly of an image capture device according to an embodiment of the present disclosure.

FIG. 9 is a perspective view of a lens assembly of an image capture device according to an embodiment of the present disclosure. This perspective view shows the toggle switch 510 accessible at the top of the housing 208 for toggling the lens cover 202 between the open and closed positions. This perspective view also shows a spring 512 that is coupled at one end to the bottom of the lens cover 202 and at the other end to the housing 208 for providing a bi-stable action of the lens cover 202 when being toggled between the open and closed positions.

FIG. 10A is a front view of a lens assembly of an image capture device with the lens cover in a closed position according to an embodiment of the present disclosure. When the cover is in the closed position, the color reference is positioned at the aperture or opening (second port) of the lens assembly housing. In this way, an image of the color reference can be captured independently and without any external light affecting the captured image. The color reference can include one or more color samples as needed or desired for a particular implementation. The captured image of the color reference can be used to calibrate the camera and/or to make color adjustments during analysis or processing of an image of the subject's skin.

Unlike conventional systems in which calibration references are typically placed within an enclosure during a calibration stage and are then moved out of the enclosure during the skin image acquisition stage, the calibration standard is not within the enclosure and is mounted on the inside of the movable lens cover in various embodiments.

FIG. 10B is a front view of a lens assembly of an image capture device with the lens cover in an open position according to an embodiment of the present disclosure. Lens cover 202 pivots from the position shown in FIG. 10A to the position shown in FIG. 10B via bearing 1074. A switch such as the toggle switch 510 shown in FIG. 9 can be operated to control spring 512 to pivot the lens cover 202 about the bearing 1074. When the lens cover is open as shown here, the second port 204 of the integration sphere 203 is exposed to permit a skin sample image to be taken.

In an embodiment, the cover is sized such that when the cover is in the open position shown in FIG. 10B, the color reference is moved out of the way and not in the captured image. In an alternative embodiment, the cover includes an aperture or opening that is positioned at the aperture or opening of the lens assembly housing when the cover is in the open position in order to enable capture of an image of the subject's skin without the color reference being in the captured image.

It should be noted that the internal lens cover can be configured in different ways while remaining within the scope of the invention. For example, a different mechanism can be used in place of the spring to control the movements between the open and closed positions.

FIG. 11A is an exploded view of the lower chamber and upper chamber of a lens assembly for an image capture device according to an embodiment of the present disclosure. Some of the components of FIG. 5 are shown in greater detail here. In this view, the host device is on the right side and the skin is on the left side. To more clearly illustrate the example, only one screw is shown instead of all four screws from FIG. 5.

When assembled, lower chamber 514 and upper chamber 517 contact at the flat parts so that the recessed parts form a light pipe 205 in the region indicated and an integrating sphere 203 in the region indicated.

FIG. 11B is an alternate exploded view of the lower chamber and upper chamber of a lens assembly for an image capture device according to an embodiment of the present disclosure. In this view, the host device is on the left side and the skin is on the right side. Here, color reference 1190 on the inside of the lens cover 202 is visible.

Color reference 1190 is provided on the side facing the integration sphere 203 and is positioned in front of the second port 204 when the lens cover 502 is in the closed position. In this position, an image of the color reference can be captured independently and without any external light affecting the captured image. The color reference can include one or more color samples as needed or desired for a particular implementation. The captured image of the color reference can be used to calibrate the camera and/or to make color adjustments during analysis or processing of an image of the subject's skin taken when the lens cover 502 is in the open position.

The image capture device can be operated as follows. A user is someone who operates a specially-programmed application on the host device to capture an image of a skin sample of another person or the user herself. In one exemplary use case, the lens cover 202 is in a closed position by default in which the second port 204 is covered (e.g., in the position shown in FIG. 10A). This prevents images from being accidentally captured.

To begin capturing an image, the user operates switch 510 to move the lens cover to an open position in which the second port 204 is exposed (e.g., in the position shown in FIG. 10B) and an image of a skin sample can be taken. The user places the image capture device against a skin surface/sample (which can the user's own skin or another user's skin) so that the fascia is contacting the skin.

Figure 12:
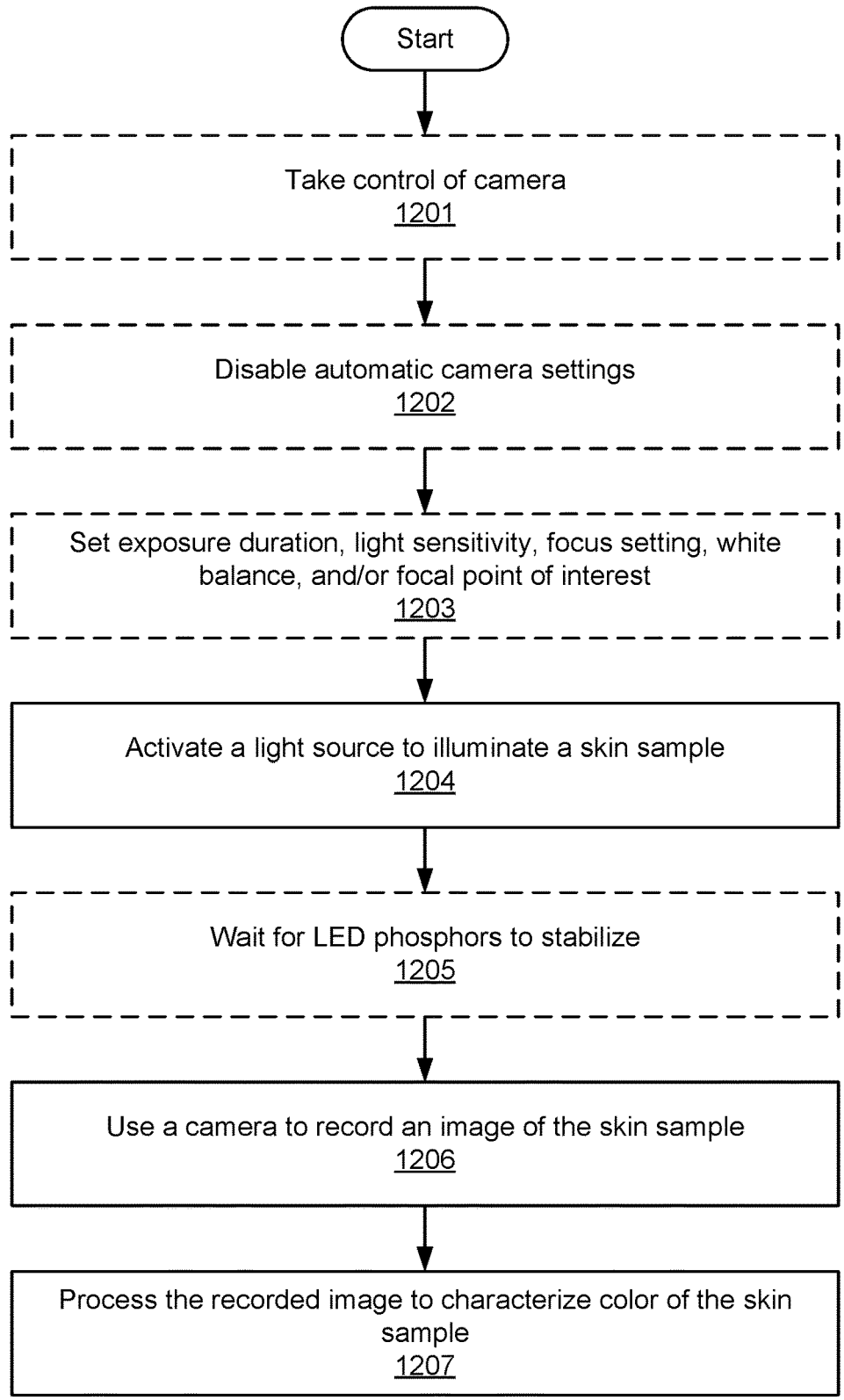
FIG. 12 is a flow chart illustrating an embodiment of a process for capturing an image using the image capture device.

The host device has a specially-programmed application that controls its camera and flash LED (and optionally other settings or hardware). First, the flash LED is activated to illuminate the skin sample to cause light from the flash to enter the light chamber through the port facing the skin sample. Light from the host device's flash LED enters the light pipe 205 and illuminates the integrating sphere 203. Lens 280 focuses the image. Then, the host's camera record an image or video of a portion of the dispersed light in the light chamber. The recorded image can be used to determine a color of the skin sample. In various embodiments, a plurality of images or videos can be taken. The application can display instructions for how to position the image capture device or what images to take. For example, a graphical user interface on the host device instructs the user to take three images: one of the cheek, one or the forehead, and one of the neck. Naturally, other areas are possible and a user can be instructed to re-take an image of a particular region. An example process is shown in FIG. 12.

In various embodiments, after taking the initial image or video of the skin sample, the color can be adjusted or otherwise corrected. As further described with respect to FIGS. 14 and 15, a number of factors can be considered to make the color adjustment including without limitation user's feedback and ethnographic color adjustment. For example, a user may wish to appear darker or lighter depending on season or cultural preferences. The user can communicate this preference or, based on a geographical location, time or year, or other domain knowledge, the application can automatically make such adjustments.

The image capture device disclosed herein finds application in variety of settings. For example, the image capture device can be used as part of a color customization system. The determined skin color and characteristics can be used to produce customized cosmetics. Cosmetics retailers may use the determined skin color in conjunction with custom cosmetics mixing and dispensing machines at production sites such as retail stores or on-line order fulfillment sites. In some cases, the entire process of recording skin color measurements for a customer, producing a custom cosmetics recipe based on the skin color measurements, and mixing and dispensing the customized cosmetic based on the custom cosmetics recipe, can occur in the store while the customer waits. In other cases, recording of the customer's skin color measurements can be done offsite, such as by the customer at home, with the recorded information transmitted in unprocessed form (e.g., raw data readings) or processed form (e.g., processed to characterize the captured color and/or converted into a custom cosmetics recipe) to a production site where the customized cosmetic is mixed and dispensed.

The following figures show processes for operating the image capture device, determining a custom color by operating the image capture device, and formulating a custom color cosmetic based on the determined custom color.

FIG. 12 is a flow chart illustrating an embodiment of a process for capturing an image using the image capture device. The process can be implemented by a host/interface device such as the ones described here. The host device records an image of a skin sample through the image capture device. As described herein, the host device includes a camera and a light source (such as a flash LED). The host device includes a processor, and the processor has associated memory for storing an application that can be executed on the processor.

The process includes activating a light source to illuminate a skin sample (1204). The process illuminates the flash LED in low intensity "torch" mode via an API call. Activating a light source to illuminate a skin sample causes light therefrom to enter a light chamber of an image capture device through a port facing a skin sample.

The process includes using a camera to record an image of the skin sample (1206). In various embodiments, an image of a portion of the dispersed light in the light chamber is recorded, where the camera is positioned to have a light path from the light chamber. The application captures an image, again via API call, and saves the image to the device. For example, the image is saved to the device's memory or transmitted to a remote server for further processing.

The process includes processing the recorded image to characterize color of the skin sample (1207). An example process for characterizing color is further described with respect to FIGS. 13 and 14.

The process may perform additional optional tasks as follows. Prior to activating the light source at 1204, the process requests exclusive control of the camera (1201), via a provided API call. If control is not granted, execution is aborted. Once control is granted, the application disables all automatic camera settings (focus, shutter speed, exposure, etc.) again using documented API calls (1202). During development of prototype lens assemblies for capturing skin color, it was found that camera settings configured by the mobile device application could be changed by other apps during color capture and measurement operations, thereby affecting the color capture and measurement operations. Therefore, in certain exemplary embodiments, the mobile device app maintains control of the camera and its settings for the entire color capture and measurement operations so as to prevent other apps from making unwanted changes to the camera settings.

Once automatic control is disabled, the application, via API calls, sets the exposure duration, and other settings chosen to allow for clear, well-lit images with the attached image capture device (1203). In various embodiments, the application sets the focal point of interest, which is the point of the image the camera uses to evaluate focus and other image properties. After activating the light source at 1204, the process waits for the light output for the phosphors in the LED to stabilize (e.g., around 5 seconds in certain exemplary embodiments) (1205).

Figure 13:
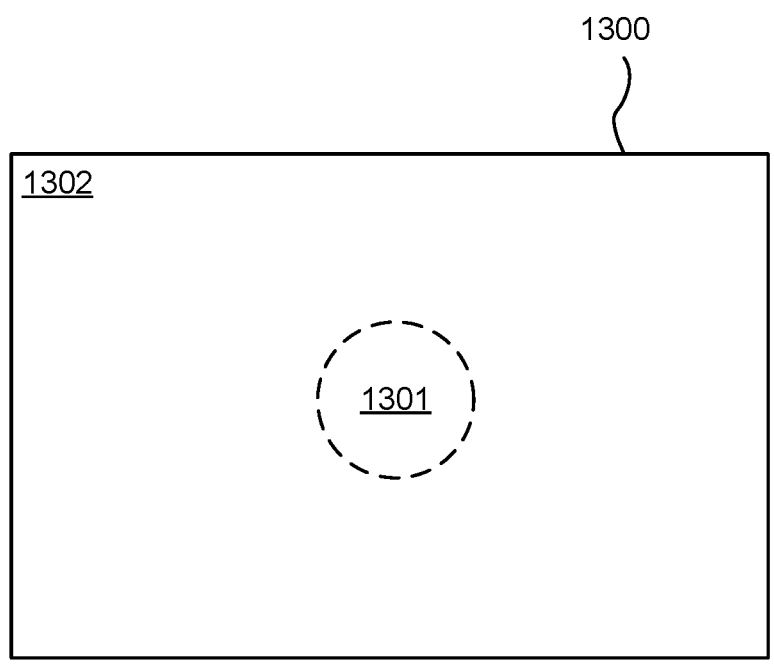
FIG. 13 is a diagrammatic representation of an image captured using an image capture device according to an embodiment of the present disclosure.

FIG. 13 is a diagrammatic representation of an image captured using an image capture device according to an embodiment of the present disclosure. The captured image 1300 includes pixels that measure the light reaching the camera imaging device from the inside of the integration sphere 203. These pixels, corresponding to those in region 1302, form the majority of the image. The pixels in region 1302 can be used to set the white balance of the image, are useful as a calibration reference, and are an excellent target for focal point of interest functions built into the device operating system. The region near the center of image 1301 is made up of pixels with values that change based on light reflected by the skin presented to port 204. The pixel values in region 1301 are processed to obtain the color measurement.

Figure 14:
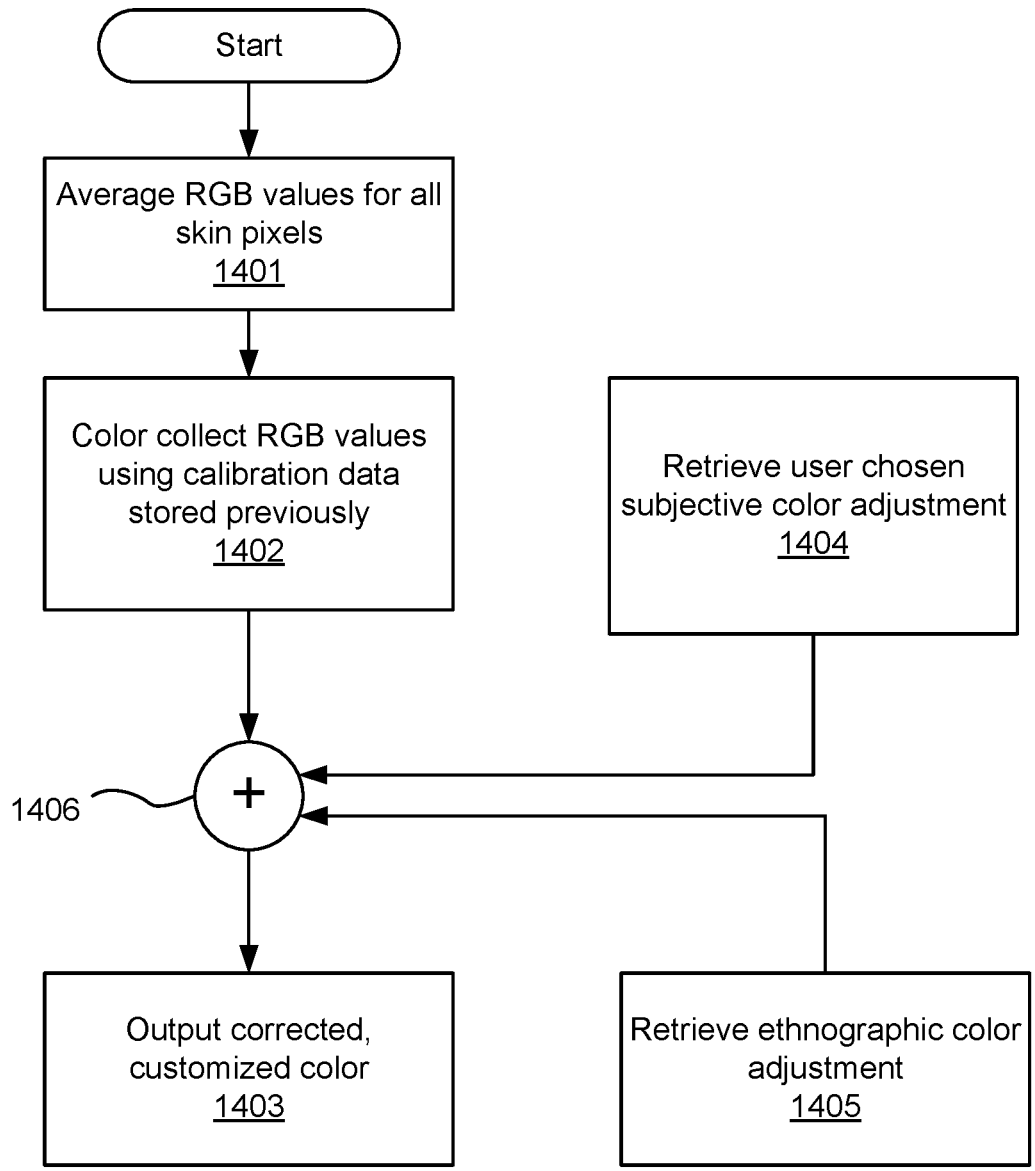
FIG. 14 is a flow chart illustrating an embodiment of a process for color measurement from a captured image and customization based on user preference and ethnographic data.

FIG. 14 is a flow chart illustrating an embodiment of a process for color measurement from a captured image and customization based on user preference and ethnographic data. Once the image is captured using an image capture device, as above, the color is extracted by averaging all pixel values (e.g., RGB values) in region 1301 (1401). Averaging compensates in some measure for variations in skin tone and imaging noise over the area being measured. This averaging preferably is accomplished using floating-point arithmetic, to allow for the increase in measurement precision afforded by the average. The color data is then passed to a set of three second-order polynomials, which return a calibrated color (1402). The coefficients of these polynomials have been chosen using regression analysis and a calibration data set. The user can input a color adjustment via the user interface (described below). This user-input color correction is retrieved (1404) together with a second ethnographic color adjustment (1405). This ethnographic color adjustment can be used to accommodate regional and ethnic purchase preference, to increase the likelihood of a first-time color match. The subjective color adjustment (1404) and ethnographic color adjustment (1405) are added (1406) to the calibrated color value. The resulting corrected, customized color can be output in 1403 in any of several ways. The corrected values can be displayed on screen, stored in memory, and/or transmitted to a mixing/portioning machine (an example of which is mixer 2732).

In various embodiments, a user can provide feedback that adjusts one of three dimensions of potential change: darker/lighter, less/more red, or less/more yellow. User feedback makes one step of adjustment per cycle. The step size for each dimension can be different based on the original CIE L a* b* coordinate. This creates an octahedron encompassing a range of colors in CIE L a* b* space with the original CIE L a* b* coordinate in the center of the octahedron.

In various embodiments, multiple images can be combined to determine the color. For example, images of different skin regions can be averaged. The color determination can take into consideration aesthetic preferences. Sometimes, an ideal foundation match is not an exact color match. For example, an optimized match may conceal surface redness by being more neutral/golden than the measured skin color, enhance a vibrant appearance by boosting red and yellow, avoid a sallow (washed out or greenish) look, among other things. A process for determining aesthetic preferences can be based on user testing, artist feedback, and/or machine learning.

Figure 15:
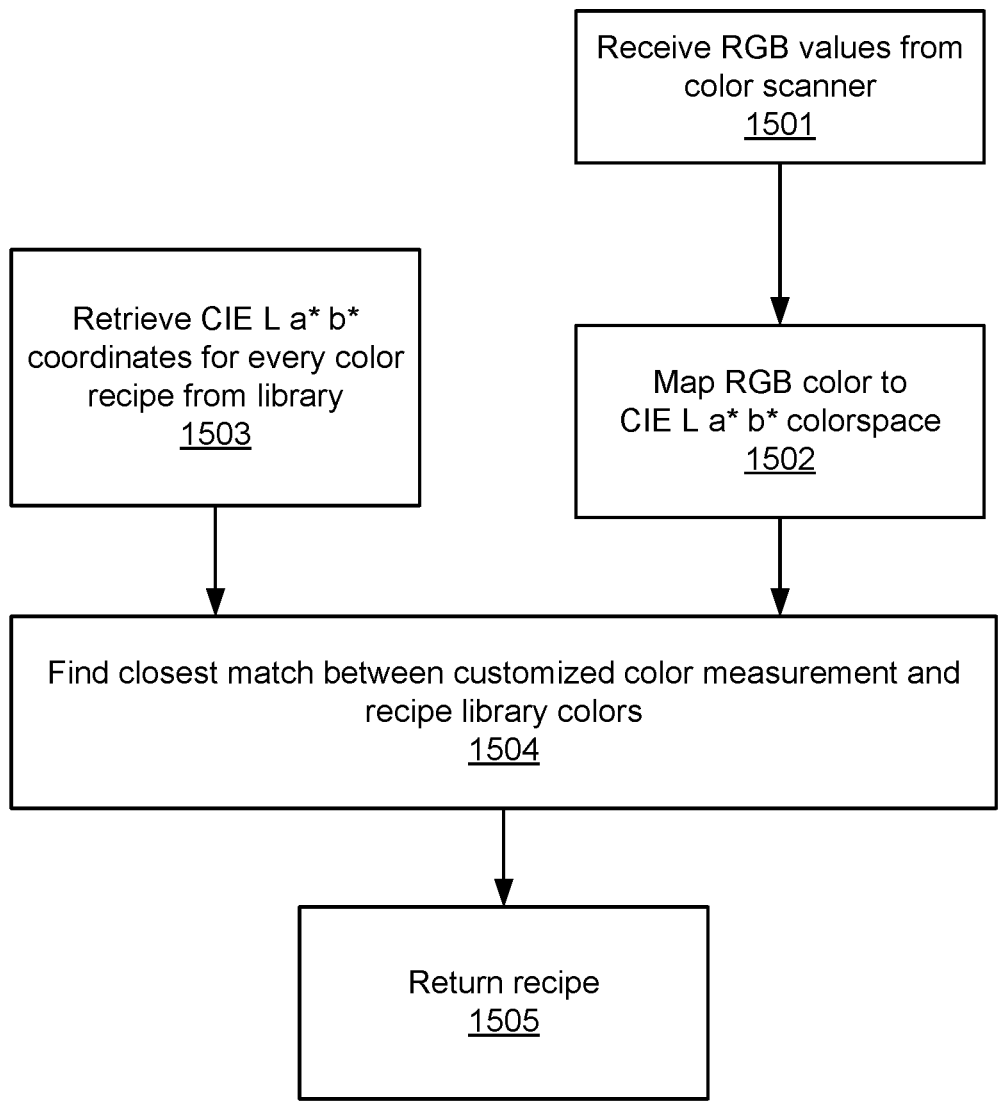
FIG. 15 is a flow chart illustrating an embodiment of a process for mapping received skin color from the image capture device to a corrected skin measurement and determining a color recipe.

FIG. 15 is a flow chart illustrating an embodiment of a process for mapping received skin color from the image capture device to a corrected skin measurement and determining a color recipe. In order to select a recipe to match a customer's skin tone preference, RGB values (corrected using calibration data and customized to match user preference and purchase trends) are received from the color measurement and customization device (1501). In this embodiment, these RGB values conform to the sRGB standard, and, in 1502, are mapped to the CIE L a* b* color space for further use. CIE L a* b* color recipe coordinates are retrieved from the library (1503). Finally, a nearest neighbor search is performed at 1504 using the colors for each of the CIE L a* b* coordinates in the color recipe retrieved in 1503 from the library. The recipe associated with the nearest color is returned as the recipe to formulate (1505). In various embodiments, the color recipe is converted to actuator forces and/or displacements. The desired color recipe, consisting of ratios of additives which sum to unity, as well as an intended total final volume, is received by a dispense and mix actuation control firmware of a custom makeup system that formulates custom makeup for a user according to the recipe. The CIE L a*b* coordinates can be stored in contour maps to incorporate preferences such as skin tone, culture, season, age, and geography.

Figure 16:
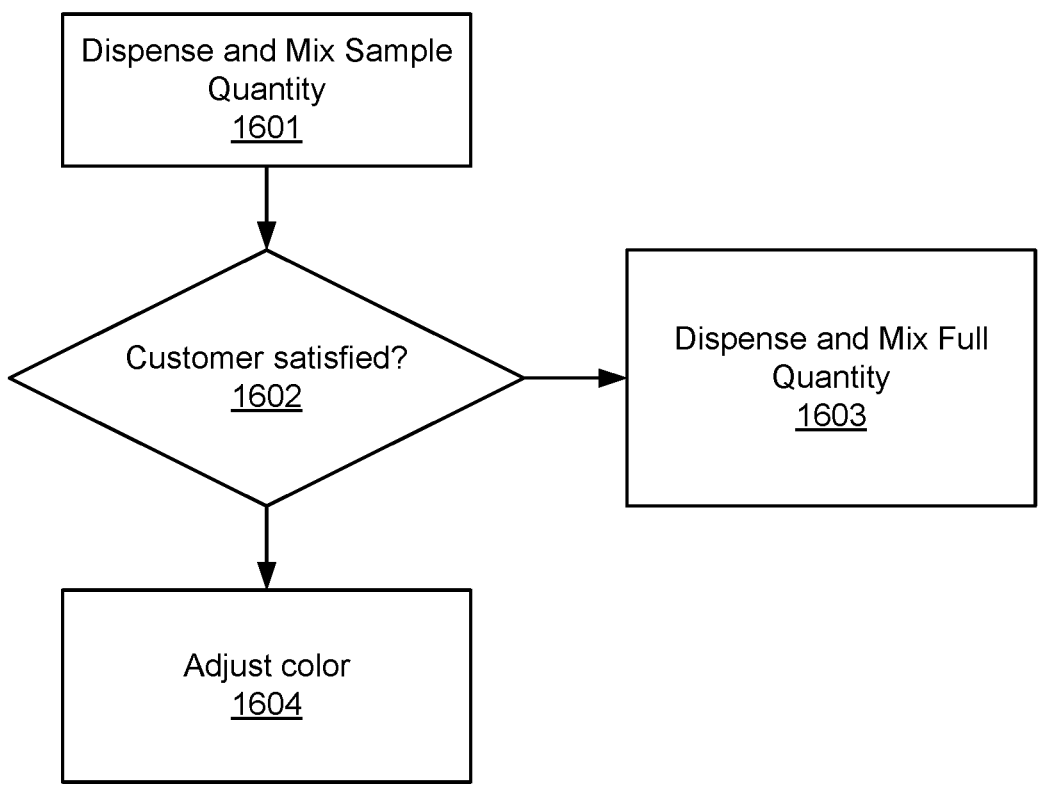
FIG. 16 is a flow chart illustrating an embodiment of a process for a user to select a color according to the user's preference.

FIG. 16 is a flow chart illustrating an embodiment of a process for a user to select a color according to the user's preference. Once a sample has been formulated in process 1601, the customer applies the sample and decides if s/he is satisfied. If so, s/he can choose in process 1602 via the smart device application user interface, to make the final full volume of product in process 1603. If s/he is not satisfied, the application will allow the user to choose a color change in process 1604, and start again with another sample in process 1601.

Figure 17:
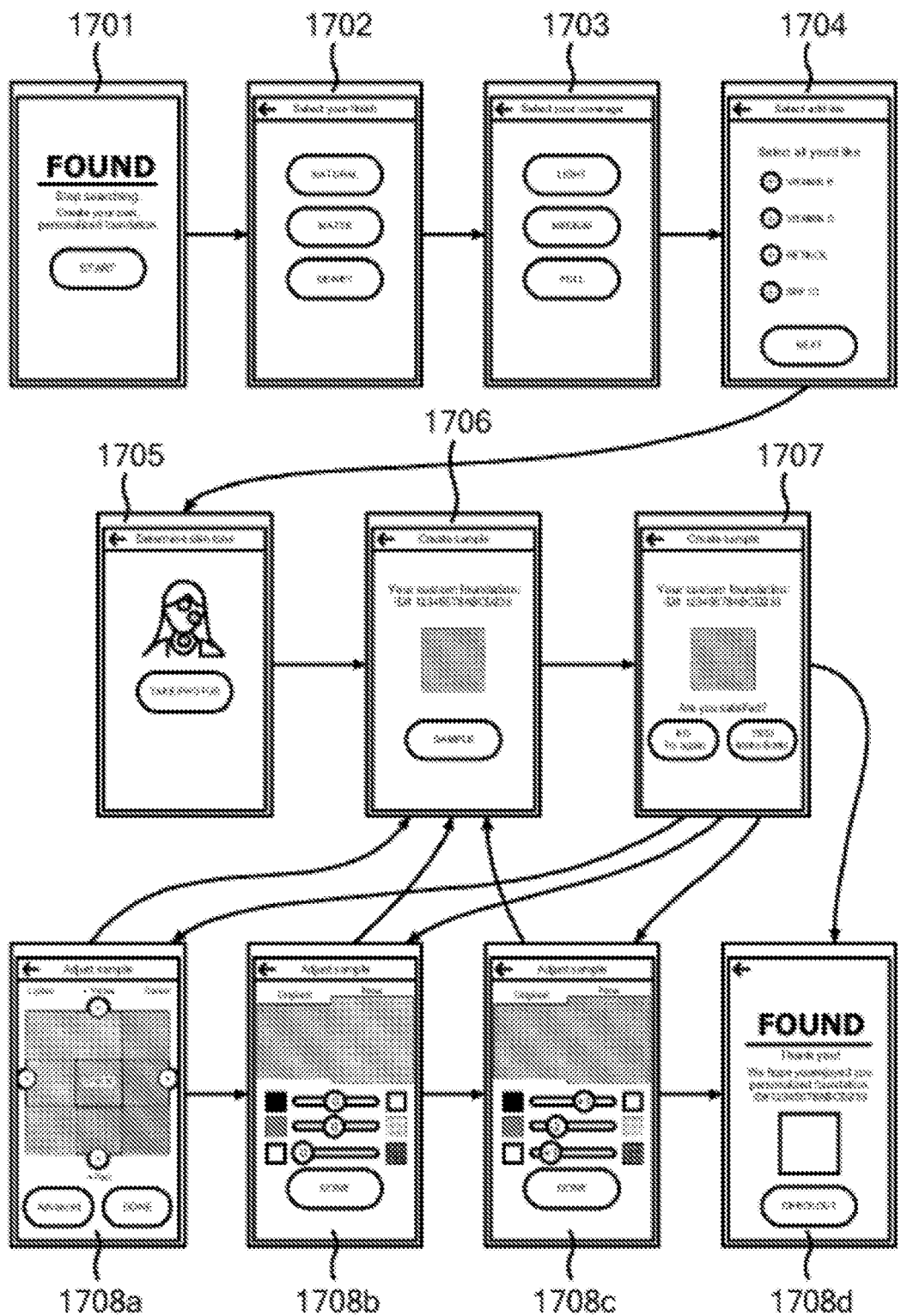
FIG. 17 is a diagram, in accordance with an embodiment of the present invention, showing a typical embodiment of a user interface for the color measurement and customization system.

FIG. 17 is a diagram, in accordance with an embodiment of the present invention, showing a typical embodiment of a user interface for the color measurement and customization system. A user interaction for the skin color measurement and customization system described above is as follows. A start screen 1701 allows the user to begin a new interaction. The user then selects the desired finish on the next screen 1702, s/he selects coverage on screen 1703, and additional additives on screen 1704. The user is then directed to measure skin pigmentation at various places, e.g., on or around the user's face, neck, or jaw via screen 1705. Once the measurement has been made, the user is presented with screen 1706, which presents the user's customized, calibrated color and allows the user to instruct the application to instruct the portioning machine to formulate a sample of this color. Then begins the recursive trial and adjust process described in FIG. 16. If the sample is satisfactory, the user can indicate so on screen 1707, which directs the user to a final screen where payment can be made for a full quantity of the color as the custom foundation is being produced by the portioning machine. If the user is unsatisfied with the sample color, then the user may choose, on screen 1707, to adjust the color using screens 1708a, 1708b, 1708c, each of which offer a different method for further customizing the desired color. The user can swipe between these screens. When the desired color customization is made, the user is returned to screen 1706 to print another sample. The process repeats until the customer is satisfied with the shade.

The following figures show other examples of an image capture device. In certain exemplary embodiments, the lens assembly is movable or repositionable relative to the camera and flash so that the lens assembly can be moved out of the way when the camera and flash are used for other purposes. This can be accomplished in any of a variety of ways.

Figure 19:
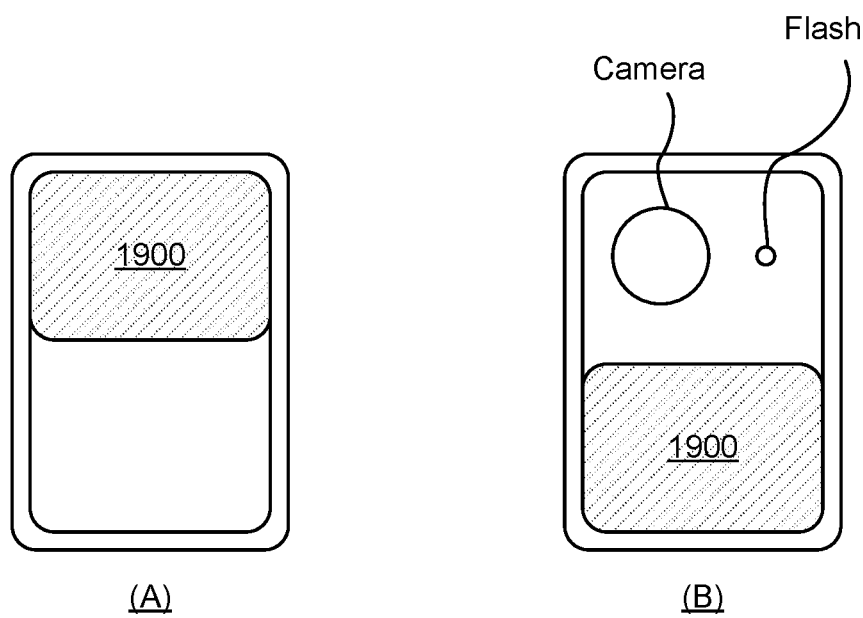
FIG. 19 is a diagram of an image capture device in which the cover is configured to move vertically according to an embodiment of the present disclosure.
Figure 20:
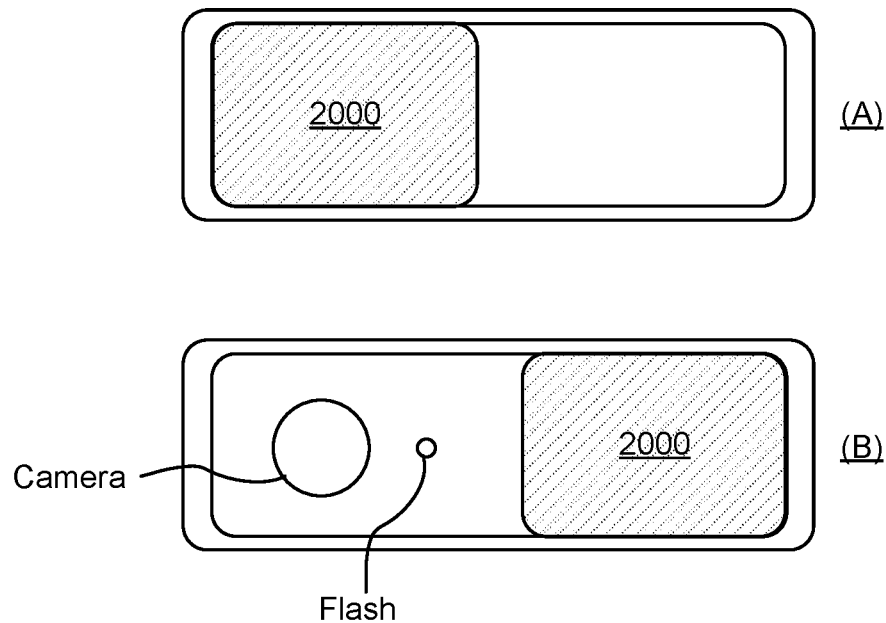
FIG. 20 is a diagram of an image capture device in which the cover is configured to move horizontally according to an embodiment of the present disclosure.

FIG. 18 is a diagram of an image capture device having a pivoting lens cover according to an embodiment of the present disclosure. Lens assembly housing 1800 is configured to pivot about the bearing between a first position (A) in which the lens assembly is positioned in front of the camera and flash and a second position (B) in which the lens assembly is out of the way of the camera and flash. An example of a pivoting lens cover is shown in FIGS. 10A and 10B. Repositioning of the lens assembly can be done in other ways. FIGS. 19 and 20 show some examples of how repositioning may be accomplished.

FIG. 19 is a diagram of an image capture device in which the cover is configured to move vertically according to an embodiment of the present disclosure. The lens cover 1900 is configured to move vertically, e.g., using a frame in which the lens cover 1900 can slide between a first position (A) in which the lens assembly is positioned in front of the camera and flash and a second position (B) in which the lens assembly is out of the way of the camera and flash.

FIG. 20 is a diagram of an image capture device in which the cover is configured to move horizontally according to an embodiment of the present disclosure. The lens cover 2000 may be configured to move horizontally, e.g., using a frame in which the lens assembly housing 2000 can slide between a first position (A) in which the lens assembly is positioned in front of the camera and flash and a second position (B) in which the lens assembly is out of the way of the camera and flash.

Figure 21:
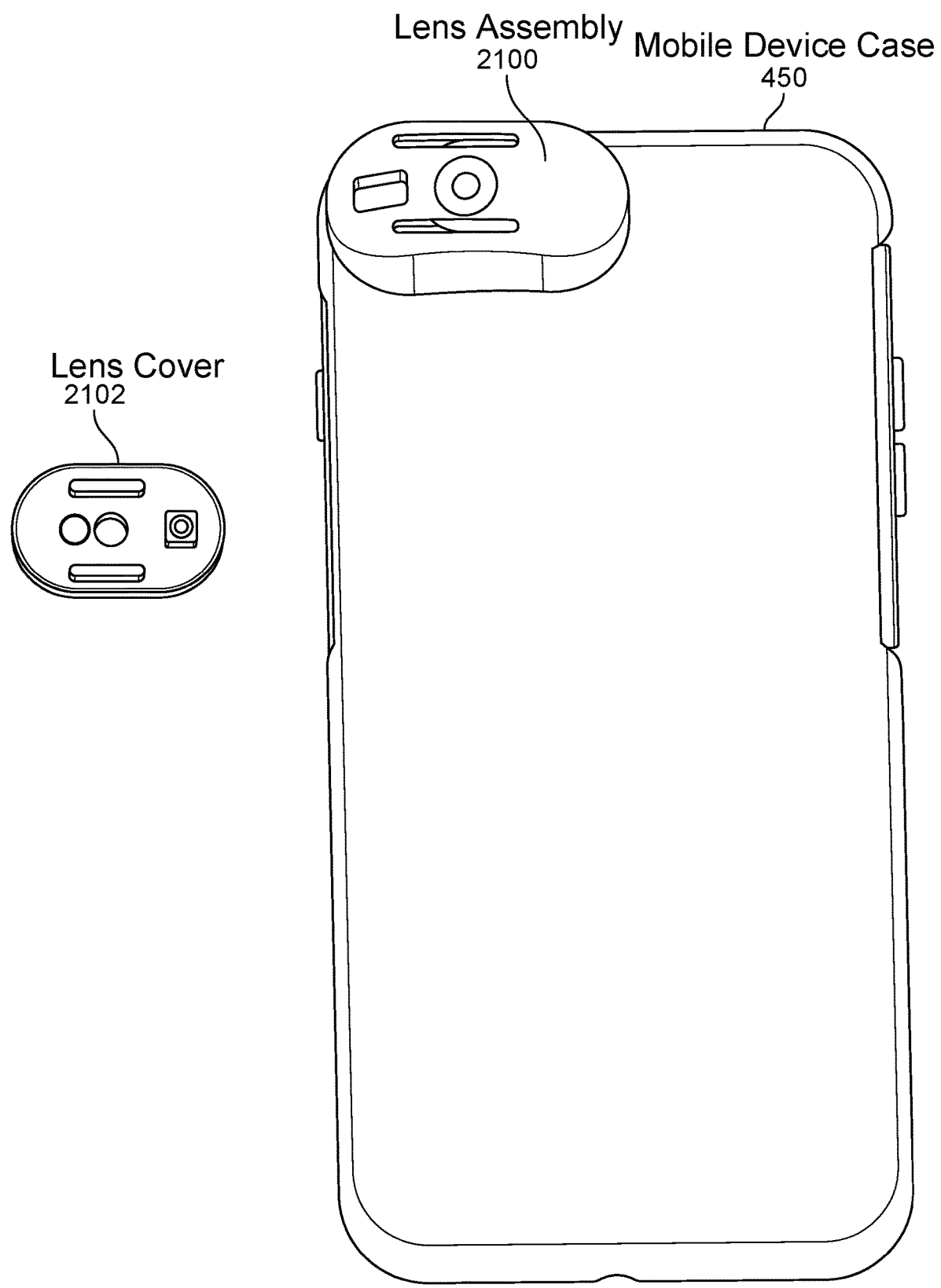
FIG. 21 is a diagram of an image capture device including guide rails and a magnetic lens cover system with the lens cover removed according to an embodiment of the present disclosure.

FIG. 21 is a diagram of an image capture device including guide rails and a magnetic lens cover system with the lens cover removed according to an embodiment of the present disclosure. Lens assembly 2100 includes a lens assembly housing and a removable lens cover 2102. In this example, the lens assembly 2100 is shown optionally coupled to a mobile device case 450, as discussed further below. It should be noted that the lens assembly 2100 alternatively can be coupled directly to the mobile device, as discussed above. As further described below, the lens cover is removably attached to the rest of the lens assembly 2100 using magnets. Here, the lens cover 2102 is removed show the guide rails of the lens assembly, which is further described below.

Figure 22:
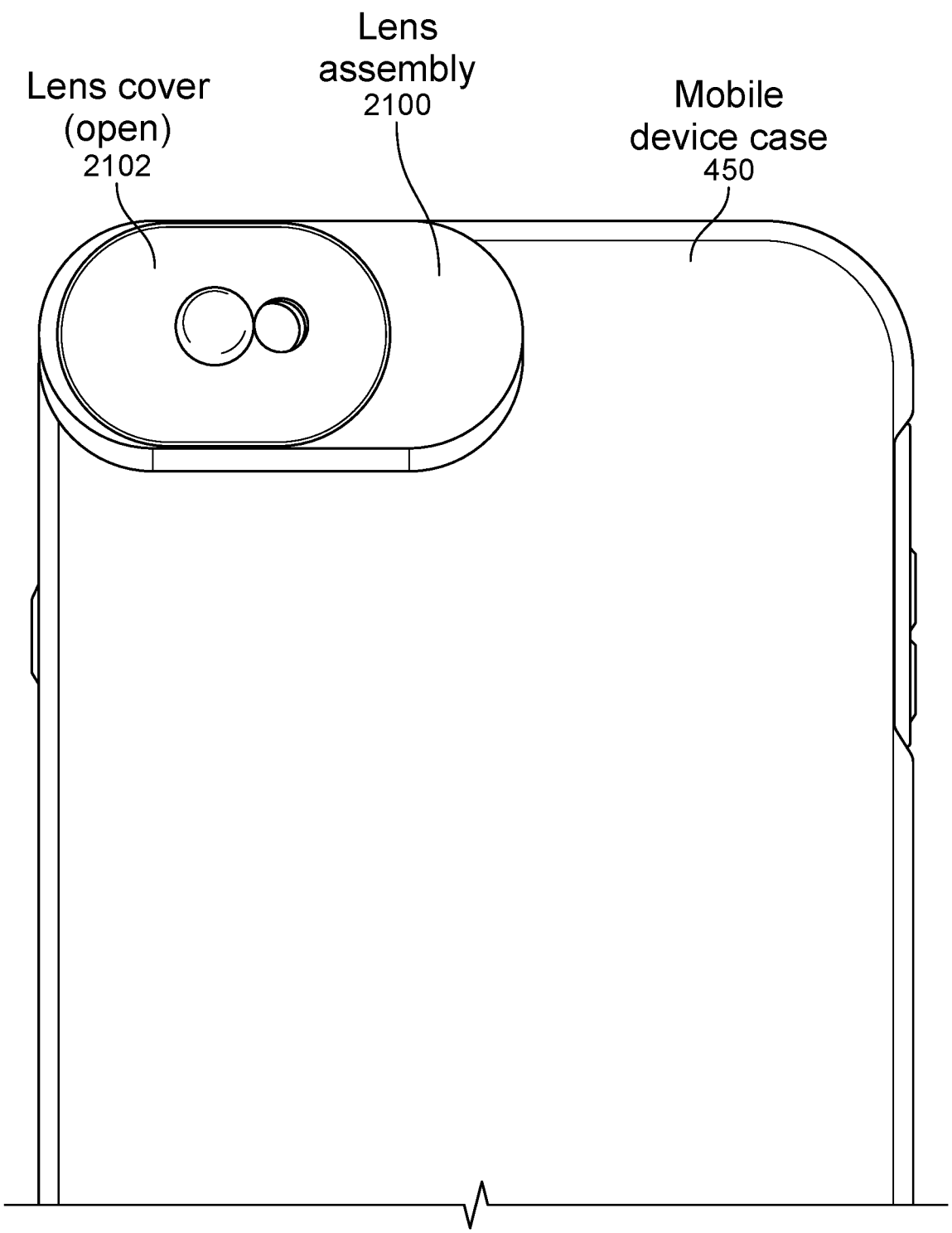
FIG. 22 is a diagram of an image capture device including guide rails and a magnetic lens cover system with the lens cover installed and in an open position according to an embodiment of the present disclosure.

FIG. 22 is a diagram of an image capture device including guide rails and a magnetic lens cover system with the lens cover installed and in an open position according to an embodiment of the present disclosure. Here, the lens cover 2102 is installed and in the open position.

Figure 23:
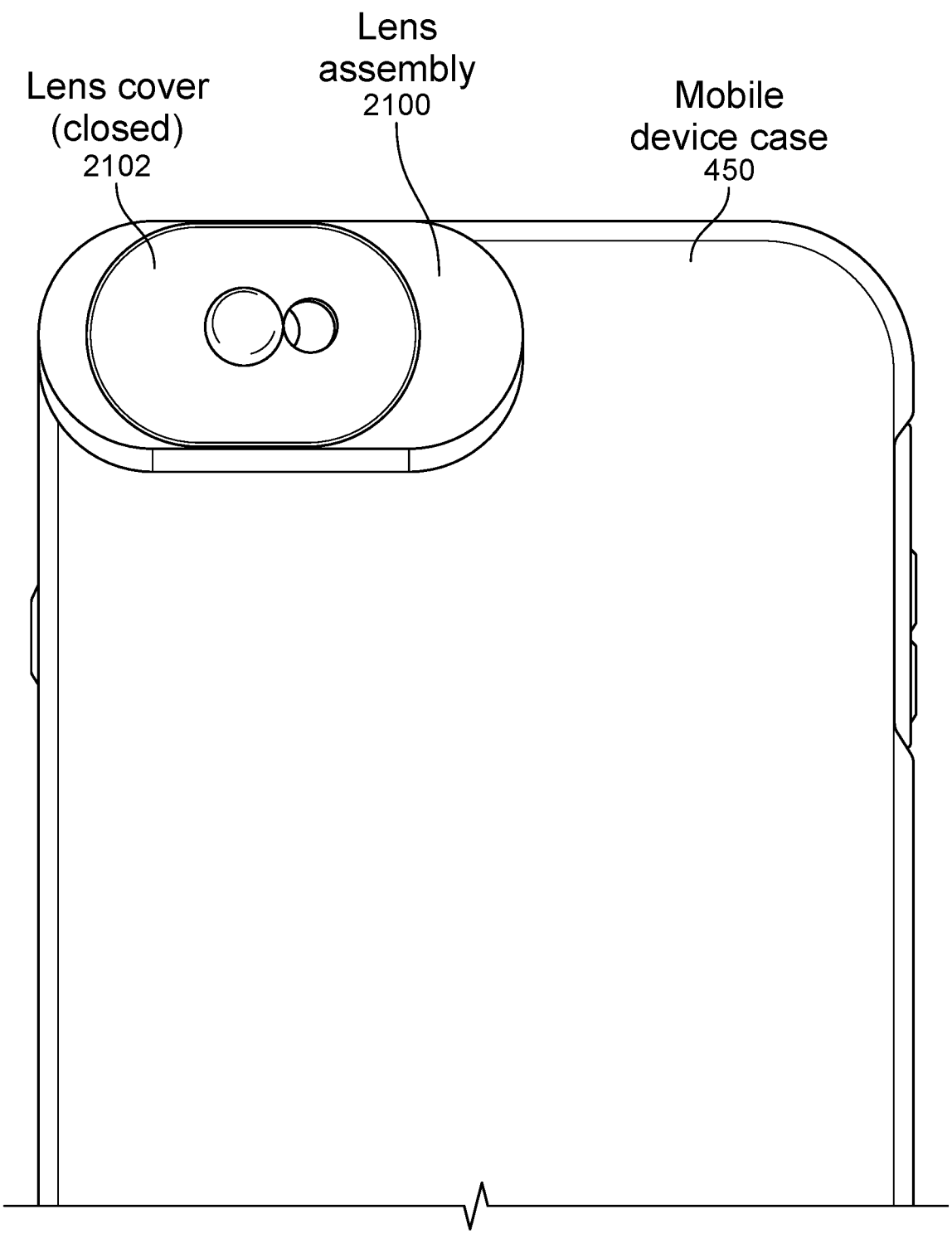
FIG. 23 is a diagram of an image capture device including guide rails and a magnetic lens cover system with the lens cover installed and in a closed position according to an embodiment of the present disclosure.

FIG. 23 is a diagram of an image capture device including guide rails and a magnetic lens cover system with the lens cover installed and in a closed position according to an embodiment of the present disclosure. Here, the lens cover 2102 is installed and in the closed position.

Figure 24:
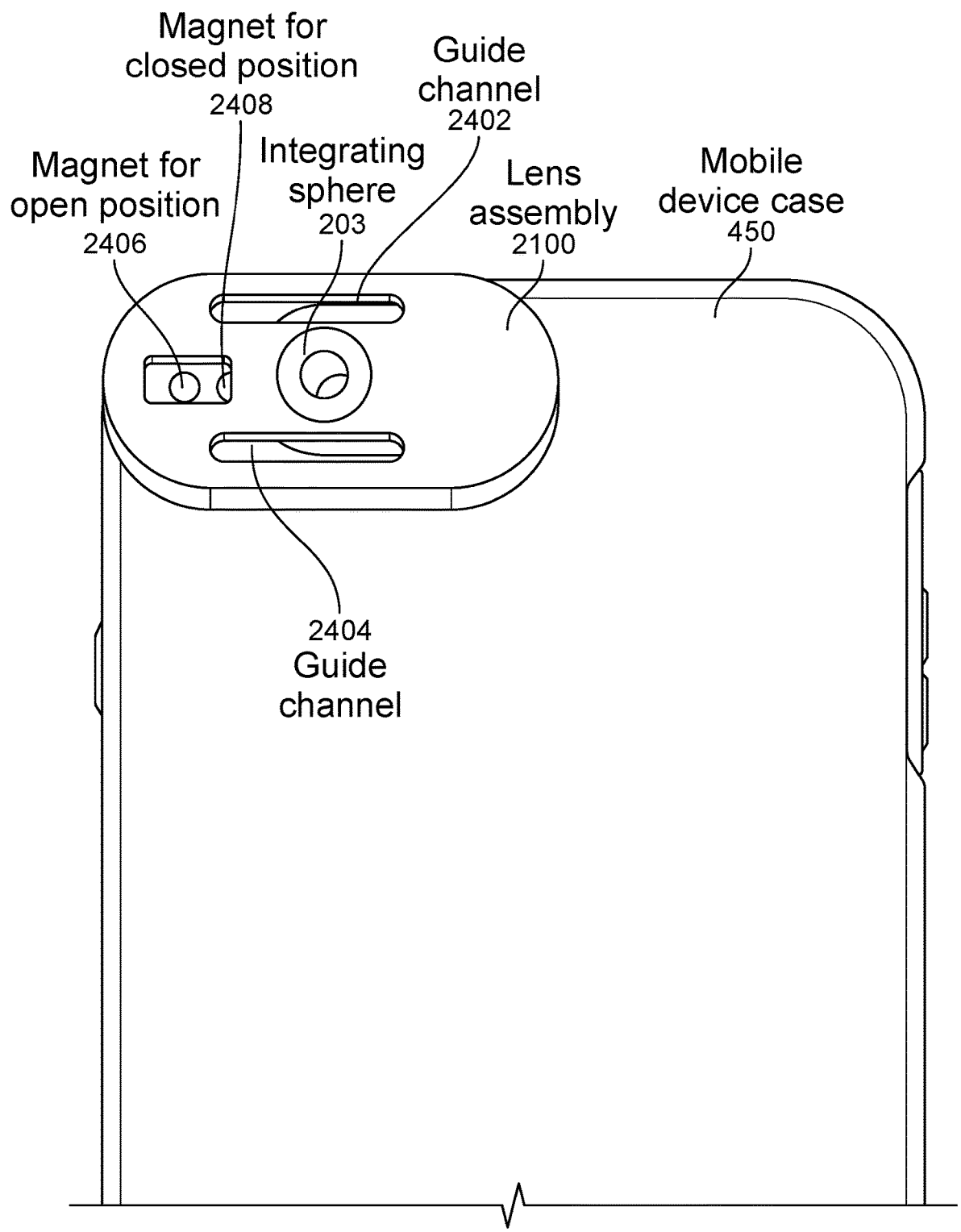
FIG. 24 is a diagram an image capture device including guide rails and a magnetic lens cover system according to an embodiment of the present disclosure.

FIG. 24 is a diagram an image capture device including guide rails and a magnetic lens cover system according to an embodiment of the present disclosure. In certain exemplary embodiments, the cover (not shown) includes two parallel guide rails that interface with corresponding guide channels 2402 and 2404 in the lens assembly housing 2100 to allow the cover to slide back and forth between the open and closed positions, although other types of configurations are possible (e.g., a single guide rail and guide channel, or configuring the lens assembly housing 2100 with the guide rails and the cover with the guide channels).

In certain exemplary embodiments, the cover is removably coupled to the lens assembly housing 2100 via magnetic attraction. In one exemplary embodiment, the cover includes a single magnet and the lens assembly housing 2100 includes two magnets positioned such that one magnet 2408 interfaces with the cover magnet when the cover is in the closed position and the other magnet 2406 interfaces with the cover magnet when the cover is in the open position, thereby allowing the cover to remain secured to the lens assembly housing 2100 whether the cover is in the open position or the closed position. It should be noted that other configurations are possible. For example, the lens assembly housing may contain magnets and the cover may contain a non-magnetic metallic element that couples magnetically with the lens assembly housing magnets, or the cover may contain a magnet and the lens assembly housing may contain two non-magnetic metallic elements that couple magnetically with the cover magnet.

Figure 25:
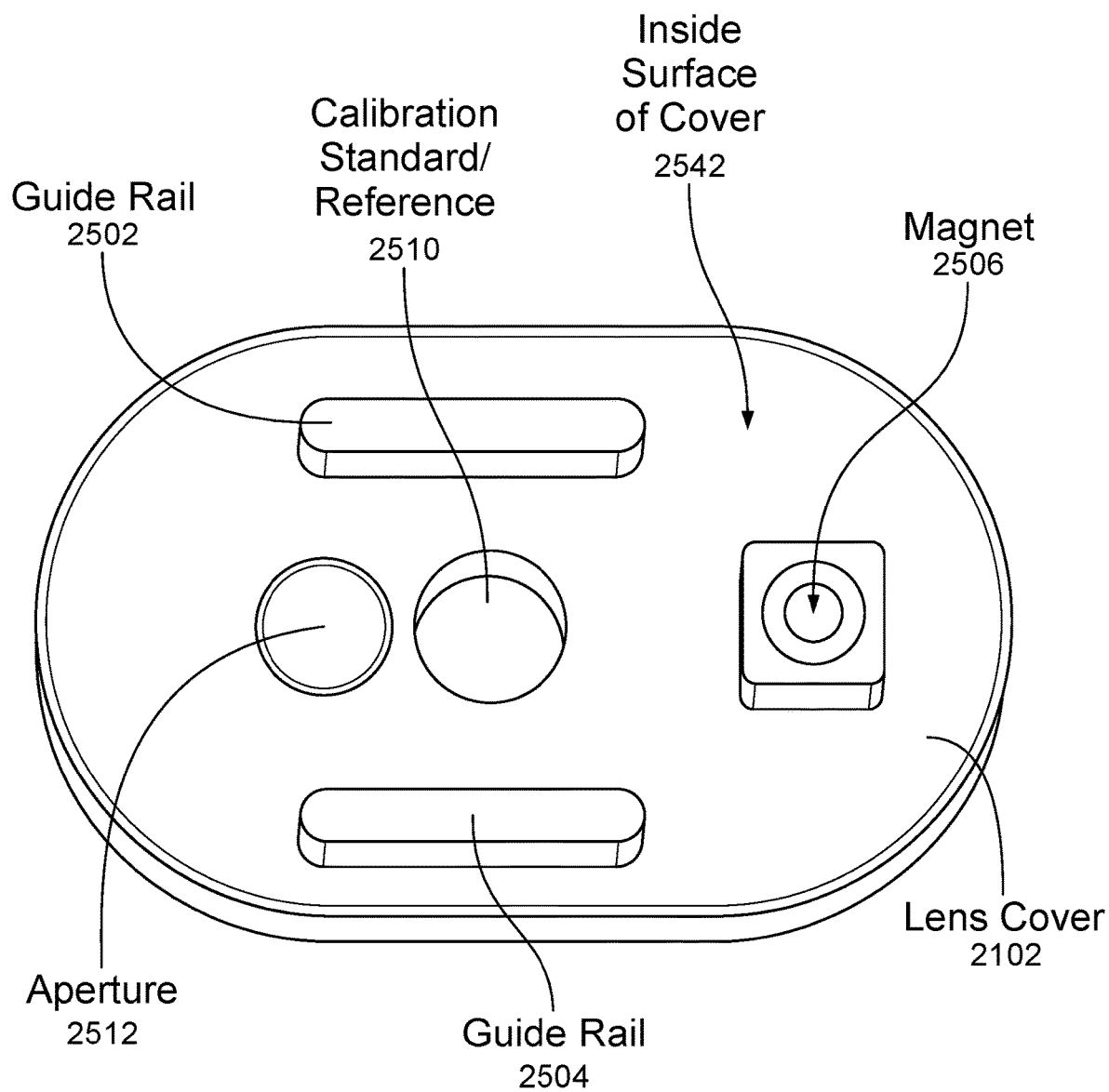
FIG. 25 is a diagram of an inside of a lens cover for an image capture device including guide rails and a magnetic lens cover system according to an embodiment of the present disclosure.

FIG. 25 is a diagram of an inside of a lens cover for an image capture device including guide rails and a magnetic lens cover system according to an embodiment of the present disclosure. This figure shows the inside surface of the prototype cover 2542, in accordance with one exemplary embodiment. The cover 2102 includes two guide rails 2502 and 2504 configured to interface with guide channels 2402 and 2404, respectively, when the cover 2102 is installed on the lens assembly housing 2100. The cover 2102 also includes a magnet or metallic element 2506 configured to interface with magnets or elements 2406 and 2408 of the lens assembly housing 2100. The cover 2102 also includes color reference 2510 configured such that the color reference is positioned at the aperture or opening of the lens assembly housing 2100 when the cover is in the closed position. The cover 2102 also includes an aperture or opening 2512 configured such that the aperture or opening 2512 is positioned at the aperture or opening of the lens assembly housing 2100 when the cover is in the open position in order to enable capture of an image of the subject's skin without the color reference being in the captured image.

Figure 26:
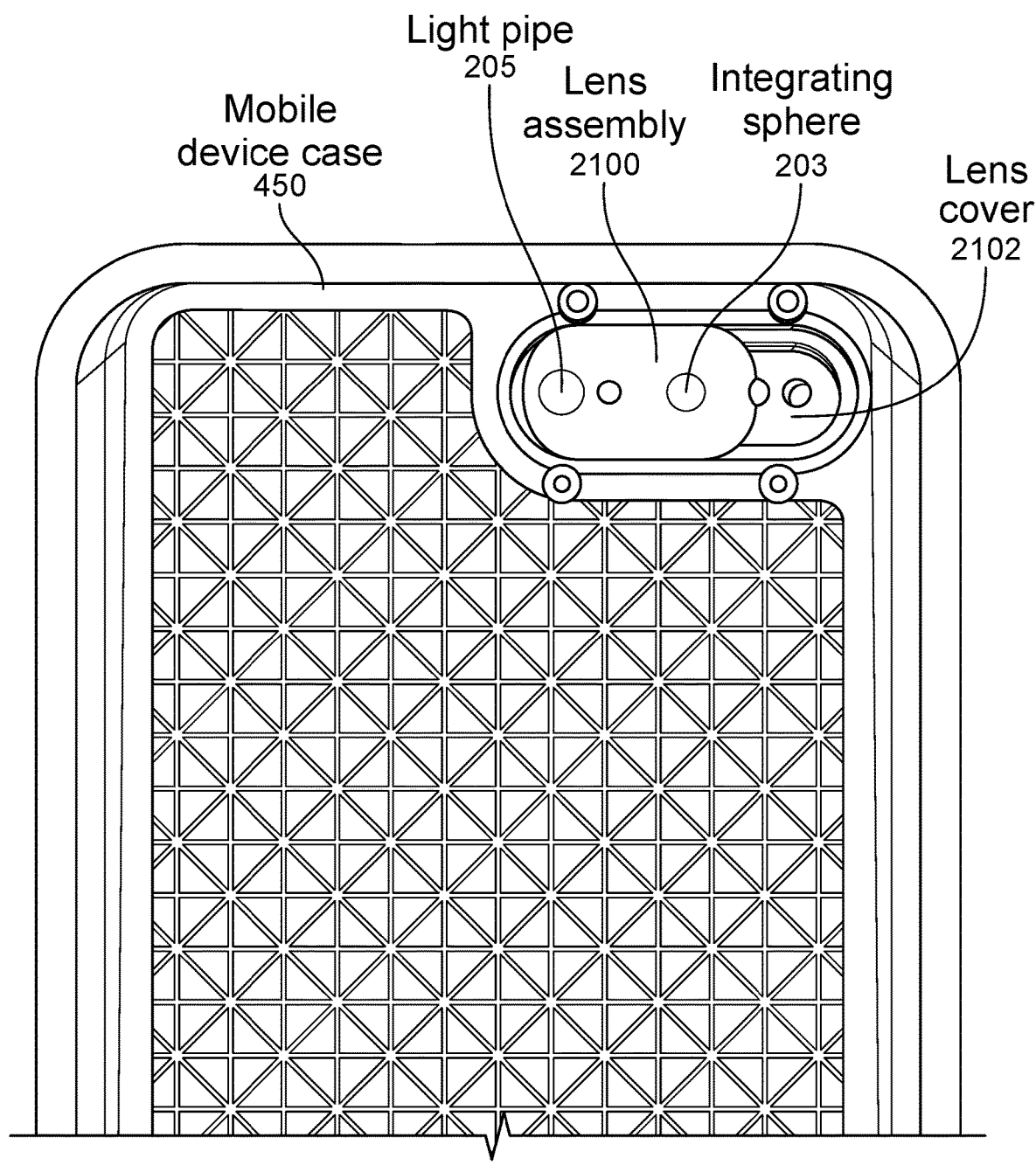
FIG. 26 is a diagram of an inside of an image capture device including guide rails and a magnetic lens cover system and the inside mobile device case according to an embodiment of the present disclosure.
Figure 27:
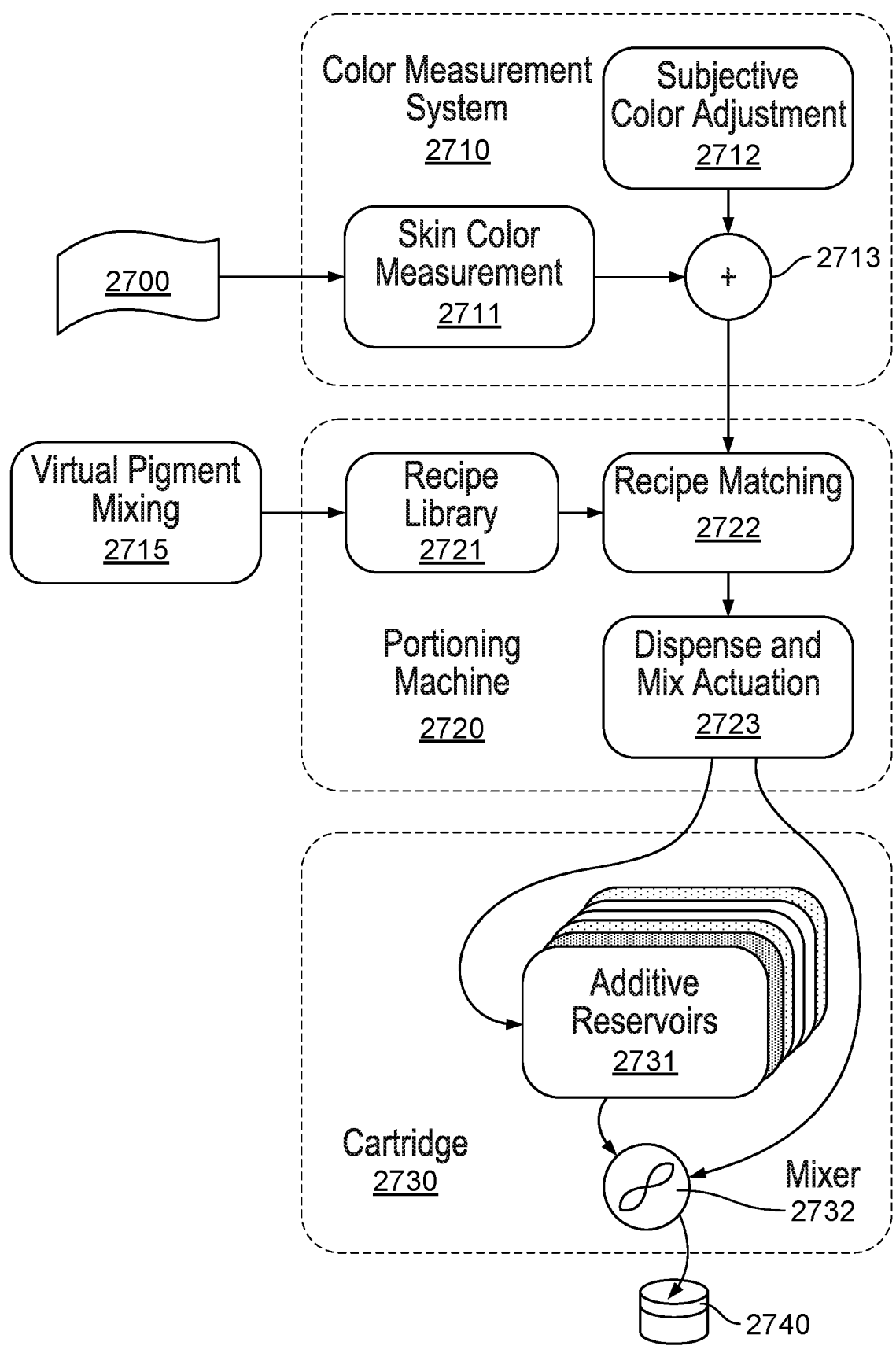
FIG. 27 shows a block diagram of a system for formulating and dispensing custom color cosmetics.

FIG. 26 is a diagram of an inside of an image capture device including guide rails and a magnetic lens cover system and the inside mobile device case according to an embodiment of the present disclosure. This figure shows the inside of the mobile device case 450 with the lens assembly housing 2100 attached such that the light pipe 205 aligns with the flash and the opening to the integrating sphere 203 aligns with the camera when the mobile device case 450 is installed on the mobile device, in accordance with one exemplary embodiment. Attaching the lens assembly housing 2100 to the mobile device case 450 rather than directly to the mobile device may have a number of advantages, including facilitating alignment of the flash and camera with the lens assembly housing 2100, and facilitating removal of the lens assembly housing 2100 in order to allow for cleaning of the camera lens as well as the lens assembly itself.

FIG. 27 shows a block diagram of a system for formulating and dispensing custom color cosmetics. The block diagram is broken down into three functional units. The color measurement system 2710, the portioning machine 2720, and the cartridge 2730. The divisions between these functional units are somewhat arbitrary, and each implementation may group features into different functional units. The color measurement system 2710 includes skin color measurement module 2711, after-sample color adjustment module 2712, and summer 2713, which combines the results of the two modules 2711 and 2712. In the embodiment presented here, the color measurement system 2710 functions are implemented on a smart phone or other camera-equipped portable computing device. The skin color measurement module 2711 performs a skin color measurement of skin near or on the face 2700 using the image capture device disclosed herein or comparable means. The subjective color adjustment module 2712 is configured to operate based on at least one of user input, the color measurement itself, and ethnographic purchase modeling. The subjective color adjustment module 2712, provides a numeric color difference to be added by summer 2713 to the color measurement before the color measurement is shared with the portioning machine 2720. The portioning machine 2720 has three principal components, a recipe matching routine 2722, a recipe library 2721, and dispense and mix actuation module 2723. A fourth component, the virtual pigment mixing module 2715, performs a set of computations, which are run once for a given set of additives.

The result of this virtual pigment mixing is a matrix of additive ratios and an accurate prediction of the resulting color. In various embodiments, this matrix is written to the mixing machine once at the time of manufacture, and (to account for pigment changes or calibration adjustments) occasionally afterward via update as needed. The recipe library 2721 may also be made available via nonvolatile memory attached to the cartridge 2730. The portioning machine 2720, in this embodiment, is a single physical machine. The recipe matching routine 2722 takes the adjusted color from the color measurement system 2710 and converts the color to the corresponding CIE L a* b* color. The recipe matching routine 2722 then runs a nearest neighbor search to identify the nearest color match. The match with the minimum Euclidian distance is taken to be the nearest color match. The selected recipe, in the form of a volume and a set of pigment ratios is delivered to the dispense and mix actuation module 2723. The dispense and mix actuation module 2723 acts on the cartridge 2730 to cause appropriate volumes of each additive 2731 to be dispensed, mixed in the cartridge 2730, and dispensed into consumer packaging 2740.

A server system such as system 106 of FIG. 1 (which may be configured to perform all or some of the color measurement and portioning machine functions) and the mixer 2732 may be located at the same location or at different locations. Some or all functionality of the server system may be integrated into the mixer 2732.

It should be noted that lens assemblies of the type described herein can be configured for use with virtually any type of host/interface device that includes a camera, including, without limitation, smartphones, tablets, notebook computers, etc. Furthermore, while use of such lens assemblies and mobile devices are generally described herein for use with a portioning machine that produces custom cosmetics based on captured color information, lens assemblies and mobile devices can be used without a portioning machine, e.g., to recommend a particular color or to recommend an existing cosmetic of a particular color based on the captured color information. Captured color information can be processed by the mobile device and/or another device including even a portioning machine which may output a recommended color prior to or in lieu of producing a custom cosmetic.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An apparatus comprising:
   a housing configured to be attached to a host device, wherein the host device has a camera and a light source;
   a light chamber within the housing, the light chamber including:
      a first port facing a direction where the host device camera would be located when the apparatus is attached to the host device, and
      a second port substantially opposite the first port;
   a light pipe within the housing, an opening in the light pipe facing a direction where the host device light source would be located when the apparatus is attached to the host device, wherein the light pipe is configured to transmit light from the host device light source for providing illumination at or about the second port;
   a lens cover configured to move between a closed position in which the lens cover blocks the second port and an open position in which the lens cover does not block the second port; and
   a set screw configured to interface with a threaded slot in the light pipe, wherein a depth of the set screw within the threaded slot controls an amount of light entering the light pipe.

2. The apparatus of claim 1, further comprising: a fascia enclosing the light chamber, the light pipe, and the lens cover within the housing.

3. The apparatus of claim 1, wherein the light chamber includes:
   an upper chamber having at least one recess; and
   a lower chamber having at least one recess, wherein the upper and lower chambers are configured to be coupled to form an integrating sphere providing non-directional illumination.

4. The apparatus of claim 1, wherein the light chamber includes:
   an upper chamber having at least one recess; and
   a lower chamber having at least one recess, wherein the upper and lower chambers are configured to be coupled to form the light pipe.

5. The apparatus of claim 1, wherein the light pipe is conical.

6. The apparatus of claim 1, wherein the light pipe includes a bend.

7. The apparatus of claim 1, wherein the lens cover is configured to pivot between the open and closed positions via a spring.

8. The apparatus of claim 1, wherein the lens cover includes a magnet configured to slide between the open and closed positions and attach to the housing in each of the open and closed positions via the magnet.

9. The apparatus of claim 1, further comprising a switch coupled to the lens cover to toggle the lens cover between the closed and open positions.

10. The apparatus of claim 1, further comprising a lens positioned such that light passes through the lens before passing through the first port to the camera to shorten a focal distance.

11. The apparatus of claim 1, wherein the apparatus is configured to be installed directly on the host device.

12. The apparatus of claim 1, wherein the apparatus is configured to be installed on or integral with a device case for the host device.

13. The apparatus of claim 12, further comprising the device case for the host device.

14. The apparatus of claim 1, wherein the lens cover includes a color reference positioned in front of the second port when the lens cover is in the closed position.

15. The apparatus of claim 1, further comprising a wide-angle aperture separate from the first port, wherein the wide-angle aperture faces a direction where a host camera wide-angle camera would be located when the apparatus attached to the host device.

16. An apparatus comprising:
   a housing configured to be attached to a host device, wherein the host device has a camera and a light source;

a light chamber within the housing, the light chamber including:
a first port facing a direction where the host device camera of the host device would be located when the apparatus is attached to the host device, and
a second port substantially opposite the first port;
a light pipe within the housing, an opening in the light pipe facing a direction where the host device light source would be located when the apparatus is attached to the host device, wherein the light pipe is configured to transmit light from the host device light source for providing illumination at or about the second port;
a lens cover configured to move between a closed position in which the lens cover blocks the second port and an open position in which the lens cover does not block the second port; and
a calibration label configured to be installed on a device case, wherein the calibration label includes a unique identifier associating the host device with the apparatus,
wherein the apparatus is configured to be installed on or integral with a device case for the host device.

17. The apparatus of claim 16, further comprising a light throttling mechanism to control an amount of light entering the light pipe based at least in part on characteristics of the apparatus or the host device.

18. The apparatus of claim 16, further comprising: a fascia enclosing the light chamber, the light pipe, and the lens cover within the housing.

19. The apparatus of claim 16, wherein the light chamber includes:
an upper chamber having at least one recess; and
a lower chamber having at least one recess, wherein the upper and lower chambers are configured to be coupled to at least one of: form an integrating sphere providing non-directional illumination or be coupled to form the light pipe.

20. The apparatus of claim 16, wherein at least one of: the light pipe is conical or the light pipe includes a bend.

21. The apparatus of claim 16, further comprising a switch coupled to the lens cover to toggle the lens cover between the closed and open positions.

22. The apparatus of claim 16, wherein the apparatus is configured to be installed directly on the host device.

23. The apparatus of claim 16, further comprising the device case for the host device.

24. The apparatus of claim 16, wherein the lens cover includes a color reference positioned in front of the second port when the lens cover is in the closed position.

25. The apparatus of claim 16, further comprising a wide-angle aperture separate from the first port, wherein the wide-angle aperture faces a direction where a host camera wide-angle camera would be located when the apparatus attached to the host device.

26. An apparatus comprising:
a housing configured to be attached to a host device, wherein the host device has a camera and a light source;
a light chamber within the housing, the light chamber including:
a first port facing a direction where the host device camera of the host device would be located when the apparatus is attached to the host device, and
a second port substantially opposite the first port;
a light pipe within the housing, an opening in the light pipe facing a direction where the host device light source would be located when the apparatus is attached to the host device, wherein the light pipe is configured to transmit light from the host device light source for providing illumination at or about the second port;
a lens cover configured to move between a closed position in which the lens cover blocks the second port and an open position in which the lens cover does not block the second port; and
a wide-angle aperture separate from the first port, wherein the wide-angle aperture faces a direction where a host camera wide-angle camera would be located when the apparatus attached to the host device.

27. The apparatus of claim 26, further comprising: a fascia enclosing the light chamber, the light pipe, and the lens cover within the housing, wherein the fascia includes an opening configured to be aligned with the wide-angle aperture.

* * * * *